US012682090B2

(12) United States Patent
Hariharasubrahmanian et al.

(10) Patent No.: US 12,682,090 B2
(45) Date of Patent: Jul. 14, 2026

(54) ANISOTROPIC COMPRESSION AS APPLIED TO COLUMNAR STORAGE FORMATS

(71) Applicant: Oracle International Corporation, Redwood Shores, CA (US)

(72) Inventors: Shrikumar Hariharasubrahmanian, Palo Alto, CA (US); Jean-Pierre Dijcks, Belmont, CA (US); Jacco Draaijer, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 299 days.

(21) Appl. No.: 18/073,890

(22) Filed: Dec. 2, 2022

(65) Prior Publication Data
US 2023/0101153 A1 Mar. 30, 2023

Related U.S. Application Data

(62) Division of application No. 16/656,399, filed on Oct. 17, 2019, now Pat. No. 11,562,085.
(Continued)

(51) Int. Cl.
*H04L 9/30* (2006.01)
*G06F 9/451* (2018.01)
(Continued)

(52) U.S. Cl.
CPC ........ *G06F 21/6209* (2013.01); *G06F 16/221* (2019.01); *G06F 40/205* (2020.01); *G06F 40/284* (2020.01); *H04L 9/30* (2013.01)

(58) Field of Classification Search
CPC .. G06F 21/6209; G06F 16/221; G06F 40/205; G06F 40/284; H04L 9/30; H04L 9/3247
(Continued)

(56) References Cited

U.S. PATENT DOCUMENTS 8,560,854 B2 * 10/2013 Gormish ................ G06Q 10/10
                                                           713/168
10,187,347 B2     1/2019 Moffat
                  (Continued)

FOREIGN PATENT DOCUMENTS

WO     WO 2017/187207 A1     11/2017

OTHER PUBLICATIONS

Zheng et al., "Opaque: An Oblivious and Encrypted Distributed Analytics Platform", dated Mar. 2017, 17 pages.
(Continued)

*Primary Examiner* — Berhanu Shitayewoldetsadik
(74) *Attorney, Agent, or Firm* — Hickman Becker Bingham Ledesma LLP

(57) ABSTRACT

Herein are spatially scalable techniques for anisotropic compression of shared entropy between alternate representations of same data. In an embodiment, a computer compresses an uncompressed independent column into a compressed independent column. Based on the compressed independent column, an uncompressed dependent column is compressed into a compressed dependent column. The compressed independent column and the compressed dependent column are stored in a same file. In an embodiment, a computer stores, in metadata, an encrypted private key for decrypting an encrypted column. The encrypted column and the metadata are stored in a file. A request to read the encrypted column is received. Based on a public key and the file, the encrypted private key is decrypted into a decrypted private key. The public key is contained in the request and/or the file. The request is executed by decrypting, based on the decrypted private key and the file, the encrypted column.

21 Claims, 9 Drawing Sheets

COMPUTER 100

UNCOMPRESSED INDEPENDENT COLUMN 110

UNCOMPRESSED DEPENDENT COLUMN 120

FILE 130

COMPRESSED INDEPENDENT COLUMN 140

COMPRESSED DEPENDENT COLUMN 150

Related U.S. Application Data

(60) Provisional application No. 62/748,243, filed on Oct. 19, 2018.

(51) Int. Cl.

| | |
|---|---|
| *G06F 15/16* | (2006.01) |
| *G06F 16/22* | (2019.01) |
| *G06F 16/27* | (2019.01) |
| *G06F 21/62* | (2013.01) |
| *G06F 40/205* | (2020.01) |
| *G06F 40/284* | (2020.01) |
| *H04L 9/06* | (2006.01) |
| *H04L 9/08* | (2006.01) |
| *H04L 9/32* | (2006.01) |
| *H04L 15/16* | (2006.01) |
| *H04L 29/06* | (2006.01) |
| *H04L 29/08* | (2006.01) |

(58) Field of Classification Search
USPC ........................................................ 713/165
See application file for complete search history.

(56) References Cited

U.S. PATENT DOCUMENTS

| | | | | |
|---|---|---|---|---|
| 10,333,981 | B2 * | 6/2019 | Lee | H04L 63/1433 |
| 11,803,650 | B1 * | 10/2023 | Hocanin | G06F 16/221 |
| 2003/0046572 | A1 * | 3/2003 | Newman | H04L 9/0825 |
| | | | | 713/193 |
| 2004/0139319 | A1 * | 7/2004 | Favazza | H04L 63/0807 |
| | | | | 713/168 |
| 2004/0139327 | A1 * | 7/2004 | Brown | G06F 21/34 |
| | | | | 713/176 |
| 2005/0027658 | A1 * | 2/2005 | Moore | G06Q 10/107 |
| | | | | 705/64 |
| 2005/0226408 | A1 * | 10/2005 | Hotz | H04L 9/0662 |
| | | | | 380/28 |
| 2007/0194884 | A1 * | 8/2007 | Didier | G07C 9/257 |
| | | | | 340/5.82 |
| 2008/0133934 | A1 * | 6/2008 | Gopinath | G06F 11/3672 |
| | | | | 713/189 |
| 2009/0106549 | A1 * | 4/2009 | Mohamed | G06F 21/6218 |
| | | | | 713/156 |
| 2009/0110198 | A1 * | 4/2009 | Garimella | G06F 21/6218 |
| | | | | 380/277 |
| 2010/0205189 | A1 | 8/2010 | Ebrahimi et al. | |
| 2012/0109830 | A1 * | 5/2012 | Vogel | G06Q 30/06 |
| | | | | 705/64 |
| 2012/0239937 | A1 * | 9/2012 | Yamanaka | H04L 9/3247 |
| | | | | 380/279 |
| 2013/0254558 | A1 * | 9/2013 | Bogorad | H04L 9/14 |
| | | | | 713/193 |
| 2014/0215574 | A1 * | 7/2014 | Erb | H04L 63/10 |
| | | | | 726/4 |
| 2015/0006908 | A1 * | 1/2015 | Mori | G06F 16/21 |
| | | | | 713/189 |
| 2015/0058522 | A1 * | 2/2015 | Armstrong | G06F 12/1009 |
| | | | | 711/6 |
| 2016/0277374 | A1 | 9/2016 | Reid et al. | |
| 2017/0344749 | A1 | 11/2017 | Yang et al. | |
| 2018/0254901 | A1 * | 9/2018 | Egorov | H04L 9/0822 |
| 2019/0158594 | A1 * | 5/2019 | Shadmon | G06F 16/2471 |
| 2019/0164156 | A1 * | 5/2019 | Lindemann | G06Q 20/4016 |
| 2019/0340381 | A1 * | 11/2019 | Yavuz | G06F 21/606 |
| 2020/0014691 | A1 * | 1/2020 | Ortiz | H04L 9/0894 |
| 2020/0327252 | A1 * | 10/2020 | Mcfall | G06F 21/78 |
| 2023/0101153 | A1 * | 3/2023 | Hariharasubrahmanian | |
| | | | | H04L 9/30 |
| | | | | 713/165 |

OTHER PUBLICATIONS

Twitter Blog, "Dremel Made Simple with Parquet", dated Sep. 11, 2013, 12 pages.

Seiler, Klaus, "Effective data exploration via columnar data formats like Parquet", last viewed on Oct. 18, 2019, 9 pages.

Papadimitriou et al., "Big Data Analytics over Encrypted Datasets with Seabed", dated 2016, 16 pages.

Melnik et al., "Dremel: Interactive Analysis of WebScale Datasets", Proceedings of the VLDB Endowment, vol. 3, No. 1 Copyright 2010, 10 pages.

GITHUB, "Parquet", https://github.com/apache/parquet-format/blob/f1de77d31936f4d50f1286676a0034b6339918ee/README.md, dated Oct. 16, 2017, 9 pages.

Gershinsky et al., "Efficient Spark Analytics on Encrypted Data", dated Jun. 2018, 30 pages.

Gaddam, Ajit, "Securing Your Big Data Environment", Black Hat USA dated 2015, 8 pages.

Dijcks, Jean-Pierre, "Just add Magic-Performance and Security in File Based Systems" dated Nov. 22, 2017, 8 pages.

Design Specification Enterprise Parquet, File Wire-Format v0.5, dated Sep. 27, 2018, 23 pages.

* cited by examiner

202 Compress uncompressed independent column into compressed independent column

204 Based on compressed independent column, compress uncompressed dependent column into compressed dependent column 206 Store in file: compressed independent column, and compressed dependent column

FIG. 3

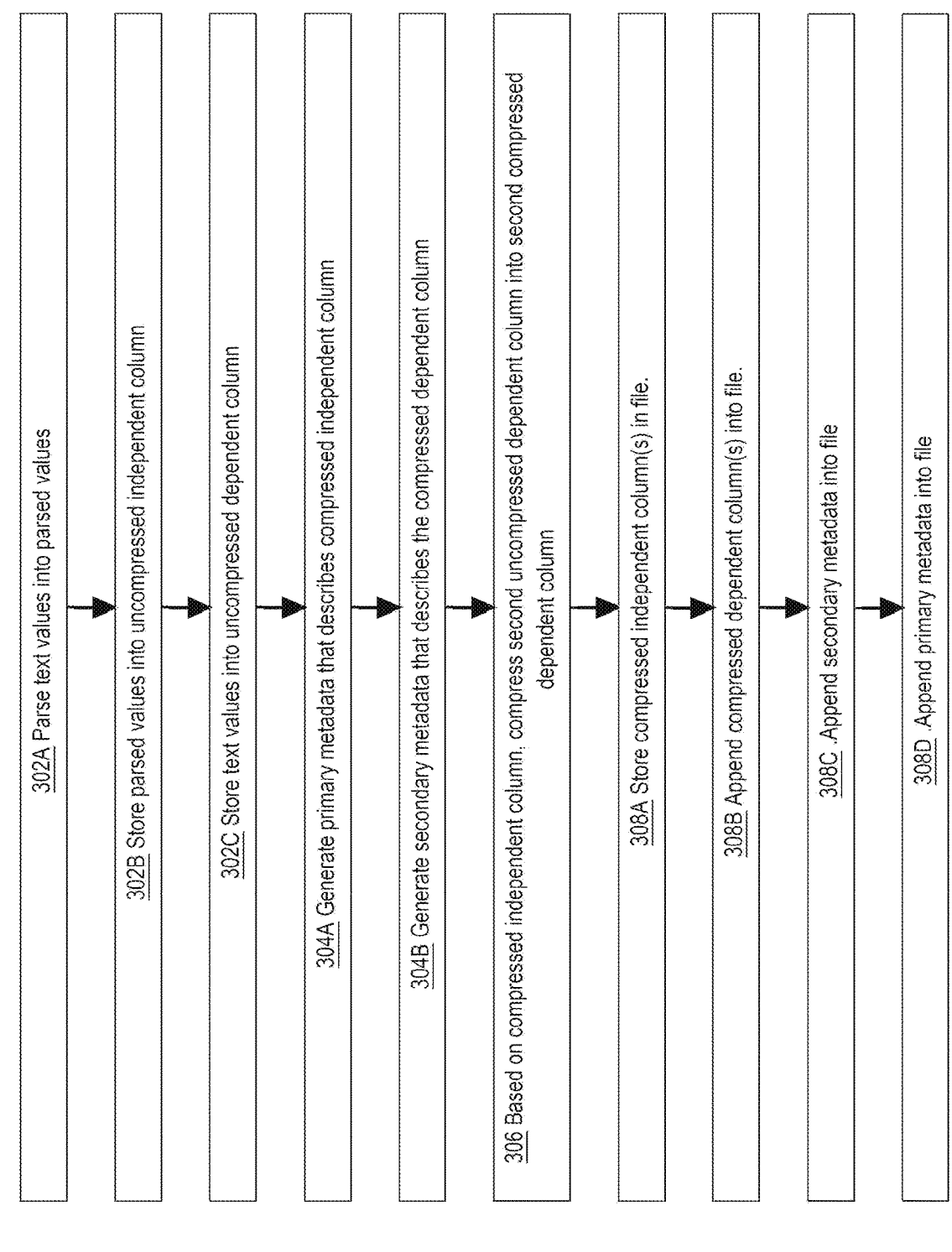

302A Parse text values into parsed values

302B Store parsed values into uncompressed independent column

302C Store text values into uncompressed dependent column

304A Generate primary metadata that describes compressed independent column

304B Generate secondary metadata that describes the compressed dependent column

306 Based on compressed independent column, compress second uncompressed dependent column into second compressed dependent column 308A Store compressed independent column(s) in file.

308B Append compressed dependent column(s) into file.

308C Append secondary metadata into file

308D Append primary metadata into file

501 Tokenize text document into separator values and text values

502 Parse text values into parsed values

503 Store parsed values into uncompressed independent column

504 Store separator values into uncompressed dependent column

505 Regenerate text document by decompressing: compressed independent column, and compressed dependent column 701 In metadata, store encrypted private key for decrypting encrypted column 702 Store in file: encrypted column, and metadata 703 Receive request to read encrypted column 704 Based on file and public key, decrypt encrypted private key into decrypted private key 705 Execute request by decrypting, based on file and decrypted private key, the encrypted column

SOFTWARE SYSTEM 900

902

APPLICATION PROGRAM 1    902A

APPLICATION PROGRAM 2    902B

APPLICATION PROGRAM 3    902C

[...]

APPLICATION PROGRAM N    902N

OPERATING SYSTEM
(e.g., WINDOWS, UNIX, LINUX, MAC OS, IOS, ANDROID, OR LIKE)    910

GRAPHICAL USER INTERFACE (GUI)    915

VIRTUAL MACHINE MONITOR (VMM)    930

BARE HARDWARE (e.g., COMPUTING DEVICE 800)

ANISOTROPIC COMPRESSION AS APPLIED TO COLUMNAR STORAGE FORMATS

CROSS-REFERENCE TO RELATED APPLICATIONS; BENEFIT CLAIM

This application claims the benefit of Divisional application Ser. No. 16/656,399, filed Oct. 17, 2019; which claims priority to Provisional Appln. 62/748,243, filed Oct. 19, 2018, the entire contents of both applications are hereby incorporated by reference as if fully set forth herein, under 35 U.S.C. § 119(e). The following are incorporated herein by reference in their entirety:

U.S. patent application Ser. No. 15/907,565 filed Feb. 28, 2018 by Hariharasubrahmanian et al, "ENTROPY SHAR-ING ACROSS MULTIPLE COMPRESSION STREAMS"

"DREMEL MADE SIMPLE WITH PARQUET" by Julien Le Dem, published Sep. 11, 2013, available at: https://blog.twitter.com/engineering/en_us/a/2013/dremel-made-simple-with-parquet.html "APACHE PARQUET" published Oct. 16, 2017, available at: https://github.com/apache/parquet-format/blob/f1de77d31936f4d50f1286676a0034b6339918ee/README.md

FIELD OF THE INVENTION

The present invention relates to storage and privacy of columnar data. Herein are spatially scalable techniques for anisotropic compression of shared entropy between alternate representations of same data.

BACKGROUND

Parquet is a file format used in the industry for columnar persistence. However, it only stores one (i.e. homogeneous) representation per column in a standardized Parquet representation: the column data type. These include int32, int64, float, double, and int96 timestamps, which are standardized by the Apache Parquet Open Source project.

As a high performance file format, Parquet is popular in the Hadoop ecosystem. It delivers high performance for database queries due to a Columnar data layout, and due to data being already parsed and converted from source text into binary representations. A conversion via extract, transform, and load (ETL) tooling is necessary for Parquet to deliver its IO Avoidance performance gains. In other words, Parquet has various limitations precisely because it is Columnar and post-ETL. Most importantly, Parquet only supports Schema-On-Write use cases, where the schema is known and supplied during ingest. In cases where the query schema or parse grammar has evolved since the original ingest was completed, the original ingest is unusable (at least not directly usable).

The ETL process has extracted and transformed the original text data into canonicalized binary data. Hence a Parquet file does not contain the original text, and cannot be used for Schema-on-Read applications. Also, a Parquet file cannot be "uncompressed" back to the original source, again since the ETL conversion process, particularly the Transform step, is generally lossy.

Parquet does not support encryption of data, so it is an insecure file format. Likewise, Parquet does not have any fine-grained security and privacy features.

BRIEF DESCRIPTION OF THE DRAWINGS

In the drawings:

FIG. 3 is a flow diagram that depicts an example process for performing additional activities for working with dependent and independent columns;

DETAILED DESCRIPTION

Figure 1:
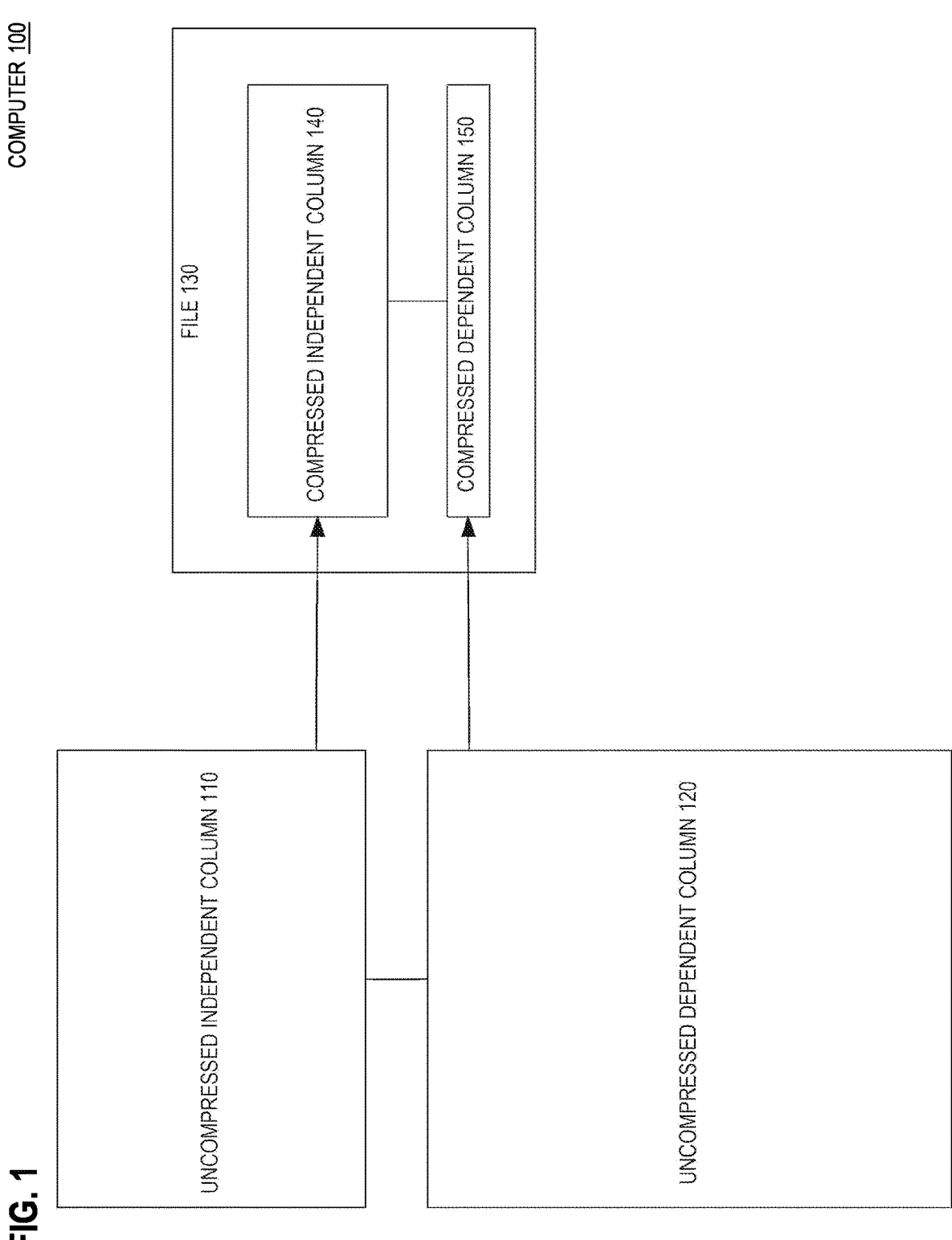
FIG. 1 is a block diagram that depicts an example computer that applies anisotropic compression to a dependent column based on compression of an independent column.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

There is an unmet industry need to enhance the Parquet file format to make it more suitable for the requirements of Enterprise customers. Features of an enhanced column store in various embodiments herein include: (1) secured data columns implemented in the file (2) row- and field-based fine-grained access control implemented in the file, (3) redaction, hashing, masking and tokenization of privacy sensitive data, (4) UDFs (user-defined functions) as knobs to control the tradeoff between information security and operational necessity, (5) evolution of information containment policies over life-cycle of the file without file rewrites, (6) grant and retraction of individual access rights without file-rewrites, (7) enhanced compression of redacted and derived value data such that additional representations of the data are materialized without much additional disk footprint, (8) materialization of Oracle Numbers and Oracle data types, and (9) faithful un-compression of original data for unzip and schema on read support.

In an embodiment, the column store has an enhanced storage format for Big Data in digital storage media such as (e.g. volatile random access) memory and (e.g. disk) files, which combines new technologies, such as Anisotropic Compression (Nymbl).

The column store is not designed as an incremental enhancement or as a replacement of Parquet. Instead the new capabilities added in Column store are complementary to Parquet, and work without restriction, in tandem with the original capabilities of Parquet. In an embodiment, new technologies such as Anisotropic Compression (Nymbl) may be combined with Parquet (for files) or other Big Data file format such as optimized row columnar (ORC) or a round-robin database (RRD) format such as RRDtool or Whisper (for time series) for Orbitz's Graphite tool. Techniques presented herein as being implemented for Parquet are exemplary. These same techniques are directly applicable to alternative column stores or column sources. For example, the column store may be implemented with various database and general storage file formats with columnar or hybrid columnar layout, and layout in single or multiple related files.

Column store files can be used in a backward compatible manner wherever Parquet files are currently in use, using standard Parquet readers. Column store resides within and is compliant with the container format of Parquet files, and therefore a column store file can continue to be read by standard Parquet readers, albeit only in backward compatible mode without any enhanced features. To activate these new features of the column store, Oracle has developed Enhanced column store readers and drivers software, which include the new technologies herein.

Anisotropic Compression is an improved compression mechanism which can compress multiple streams of data, as long as they are related, into a total compressed size which is only slightly larger than any one of those multiple streams when compressed. Anisotropic Compression is used to deliver CPU speedup using pre-materialized native data representations (such as Oracle Numbers), and fine-grained access control (such as redaction, masking and tokenization).

In an embodiment, a computer compresses an uncompressed independent column into a compressed independent column. Based on the compressed independent column, an uncompressed dependent column is compressed into a compressed dependent column. The compressed independent column and the compressed dependent column are stored in a same file.

In an embodiment, a computer stores, in metadata, an encrypted private key for decrypting an encrypted column. The encrypted column and the metadata are stored in a file. A request to read the encrypted column is received. Based on a public key and the file, the encrypted private key is decrypted into a decrypted private key. The public key is contained in the request and/or the file. The request is executed by decrypting, based on the decrypted private key and the file, the encrypted column.

1.0 Example Compression Computer

FIG. 1 is a block diagram that depicts an example computer 100, in an embodiment. Computer 100 applies anisotropic compression to a dependent column based on compression of an independent column. Computer 100 may be a rack server such as a blade, a personal computer, a mainframe, a virtual computer, or other computing device.

Within volatile (e.g. random access memory, RAM) or non-volatile (e.g. disk) storage of computer 100 are related uncompressed columns 110 and 120. An uncompressed column contains values in a format that is more or less convenient for processing and/or storage by computer 100.

For example, computer 100 may host a data store, such as a document store, a column store, or other (e.g. tabular, relational) database that aggregates values into uncompressed columns 110 and 120.

In an embodiment, uncompressed independent column 110 contains primary data that may be used as part of a system of record for analytics by computer 100, such as important values extracted from documents or naturally occurring in a column of a relational table. In an embodiment, uncompressed dependent column 120 contains secondary data, such as data derived from uncompressed independent column 110, such as values redacted for privacy or security, or data otherwise directly and statistically related to uncompressed independent column 110. For example, uncompressed dependent column 120 may be a redacted (i.e. more or less redundant and lossy) copy of uncompressed independent column 110.

In another embodiment, even though uncompressed independent column 110 contains primary data for analytics, the primary data is derived from raw data in uncompressed dependent column 120, such as raw text values that are less amenable to structured processing. For example, uncompressed independent column 110 may contain parsed (i.e. dense, strongly typed) values that are derived from raw text values in uncompressed dependent column 120. Example independent and dependent columnar content are discussed more later herein.

Herein a column, whether compressed or not or dependent or not, may be contiguously stored in a columnar format such as a sequence of (e.g. fixed or variable width) values in a vector (i.e. array). As discussed later herein, a column may be streamed such that little or none of the column buffered, such as in a sliding window buffer that can be repeatedly refilled or flushed.

For privacy, security, and/or density, uncompressed columns 110 and 120 may be compressed into respective compressed columns 140 and 150. Anisotropic compression entails asymmetry such that compression of two related uncompressed columns 110 and 120 generates respective compressed columns 140 and 150 that have very different sizes, even when uncompressed columns 110 and 120 have similar sizes and/or content.

Compressed independent column 140 has a size that is naturally based on independent compression of uncompressed independent column 110. In an embodiment, independent compression uses dictionary encoding, which entails substitution of (e.g. all or frequent) raw (i.e. sparse) values by dense codes. For example, text names of months may be dictionary encoded as integer ordinals, such as 1 for January and 12 for December, which may be zero-based instead of one-based. For example, September naturally has nine characters (e.g. bytes), but a coded month needs only one byte or only four binary digits (bits).

Plain dictionary encoding uses a single fixed width code for each (e.g. variable width) value. Adaptive encoding for higher compression, such as with Lempel Ziv Welch (LZW), may use a single variable width code for a frequent sequence of multiple values. Thus, different codes may have different widths (i.e. amounts of bits) and may represent respective value sequences of different lengths (i.e. amounts of values).

LZW is streaming in the sense that LZW needs only one pass and begins emitting an encoded downstream before reaching an end of an unencoded upstream. For example, LZW may begin emission before an encoding dictionary is fully populated with codes and values. Thus, LZW's memory use is minimal, which facilitates encoding big data (e.g. gigabytes).

For acceleration such as for a high volume live stream such as a click stream or other telemetry stream such as from an internet of things (IoT), an embodiment may use enhanced LZW compression such as Google Snappy (a.k.a. Zippy). Instead of a consolidated encoding dictionary, Snappy uses self referential encoding such that a reference in compressed data may refer back to a sequence of values in uncompressed data, such that references are somewhat akin to dictionary codes, and fragments of uncompressed data provide corresponding dictionary values.

Streaming may be further facilitated because compression formats herein are designed for single pass encoding. For example, Snappy has no consolidated metadata, such as an encoding dictionary. Likewise as explained later herein, any metadata imposed by a format of file 130 may be placed at the end of file 130. Thus, computer 100 is free to accumulate metadata in memory and write the metadata into file 130 last.

For example, techniques herein are suited for write-limited filesystems such as write once and/or append only, which are suited for high volume spooling (i.e. sequential recording) such as for a click stream, (e.g. console) logging, or time series data. For example, techniques herein are suited for use with write once file formats such as Parquet, optimized row columnar (ORC), or a round robin database (RRD) format such as for Graphite. File 130 is discussed more below.

Whether stored or streamed, uncompressed columns 110 and 120 are logically aligned to each other such that a value at any logical (i.e. element not byte) offset in uncompressed dependent column 120 depends on, or otherwise reflects, a corresponding value at the same offset in uncompressed independent column 110. For example at a same offset, uncompressed columns 110 and 120 may store a same serial number, which may be formatted as integer value 123456789 in uncompressed independent column 110 and formatted as redacted text value *--6789 in uncompressed dependent column 120.

If both of compressed columns 140 and 150 were generated by respective independent compressions, then a size of compressed dependent column 150 would be more or less proportional to a size of uncompressed dependent column 120. That may be somewhat a waste of space because even frequently recurring substrings, such as *-- need a reference or code for each occurrence. Likewise whenever a given serial number occurs in compressed independent column 140, a reference or code must still occur in compressed dependent column 150 for the redacted value, even though the redacted value could be predicted from the serial number that can be decoded from compressed independent column 140.

Uncompressed columns 110 and 120 share entropy, such that repeated values in uncompressed dependent column 120 tend to correspond to repeated values in uncompressed independent column 110. For example whenever integer value 1234 occurs in uncompressed independent column 110, then text value "1234" occurs in uncompressed dependent column 120. That is, data dependency may cause shared entropy.

In that case, information in compressed dependent column 150 may be eliminated when that information is redundant to information in compressed independent column 140, such as with anisotropic compression. Because redundancy is eliminated, the size of compressed dependent column 150 may be much smaller, almost insignificant, such as almost approaching zero. Approaches for anisotropic compression are presented in related U.S. patent application Ser. No. 15/907,565.

Anisotropic compression may have counter-intuitive outcomes. For example as shown, uncompressed independent column 110 may contain dense parsed values and thus have a smaller size than uncompressed dependent column 120 that contains sparse raw text values. Whereas with anisotropic compression as shown, compressed dependent column 150 may be smaller than compressed independent column 140.

Without anisotropic compression, a dependent column may be too big to materialize, such that compressed dependent column 150 should not be persisted. For example, durable binary data file 130 would store only compressed independent column 140. Whereas with anisotropic compression as shown, compressed dependent column 150 has negligible size, such that both of compressed columns 140 and 150 may be stored together in same file 130. As discussed later herein, a temporal cost of decoding compressed dependent column 150 is that both of compressed columns 140 and 150 should be decoded together.

Because anisotropic compression imposes very little spatial cost as a marginal cost for each additional dependent column of a same or different independent column, anisotropic compression achieves high spatial scalability. For example, an independent column may have multiple dependent columns that each entails different (e.g. progressively more) redaction. For example, a first dependent column that redacts a year in a birthday timestamp may make detecting a person's age more or less impossible.

Likewise, a second dependent column that instead or additionally redacts a month in the birthday timestamp may make detecting the person's zodiac sign impossible. Thus, privacy and/or security may be increased. For example and although not shown, compressed columns 140 and 150 may be stored in separate (e.g. Hadoop filesystem, HDFS) files that have different file permissions and thus different access control. Alternatively as shown, compressed columns 140 and 150 may both reside in same file 130, and a database management system (DBMS) may grant dependent and independent columns different accessibilities.

Although techniques herein are based on a columnar architecture, these techniques may have special benefits for a tabular database that presents data as records (i.e. row major), such as with a relational DBMS (RDBMS). For example, a column in FIG. 1 may actually store some or all table columns of a relational table, in row major or column major format. For example, compressed independent column 140 may store one, some, or all columns of a relational table as shredded (i.e. column major) and, without significantly increasing total size, compressed dependent column 150 may contain original database records (i.e. whole rows of the relational table).

Likewise, techniques herein have special benefits for a document database, such as for storing unstructured text documents, such as text files or word processor files, and/or structured or semi-structured documents that contain JavaScript object notation (JSON) or extensible markup language (XML). For example as discussed above, anisotropic compression is well suited to collocating, in file 130, a column of raw text values and a column of parsed values.

As discussed later herein, file 130 may be a Parquet file, which is self describing and strongly typed, because a Parquet file's internal metadata includes a data schema that is encoded in Apache Thrift format. Thus, Parquet's schema is recorded during the creation of file 130, which is a technique known as schema-on-write (SoW). Unfortunately, schema-on-write is fragile and thus does not well support schema evolution, which may be problematic for data longevity.

For example, same long (e.g. years) lived data may over time be processed by different versions of a same application, different applications or, in case of shared (e.g. sold) data, processed by very different software platforms for very different purposes. For example, what was originally stored as a whole phone number may later be refactored (i.e. evolved) into meaningful pieces such as an area code or an extension. Some approaches impose refactoring as a monolithic and disruptive (e.g. stop the world) process such as extraction translation load (ETL).

Another problem with schema-on-write evolution is that space linearly scales. For example, twice as many schema versions for same data needs twice as much storage. Whereas, techniques herein are non-intrusive such that a new schema may be dynamically and incrementally imposed on demand when data is eventually used, such as reused in an unanticipated way.

That is, techniques herein support schema-on-read (SoR), which has minimal initial spatial cost with anisotropic compression and no marginal spatial cost. For example, compressed independent column 140 may store schema-on-write values. Minimal initial spatial cost comes from compressed dependent column 150 that may store original raw text values that can be later parsed in new ways, which achieves schema-on-read.

Thus, dependent column 150 may store schema-less data, such as values from JSON documents. A needed schema may repeatedly evolve with many related or independent versions, but with no marginal spatial cost, because schema-on-read only needs data as originally written. Thus in addition to providing privacy, anisotropic compression also eliminates fragility, with both achievements occurring more or less without spatial overhead.

2.0 Example Compression Process

Figure 2:
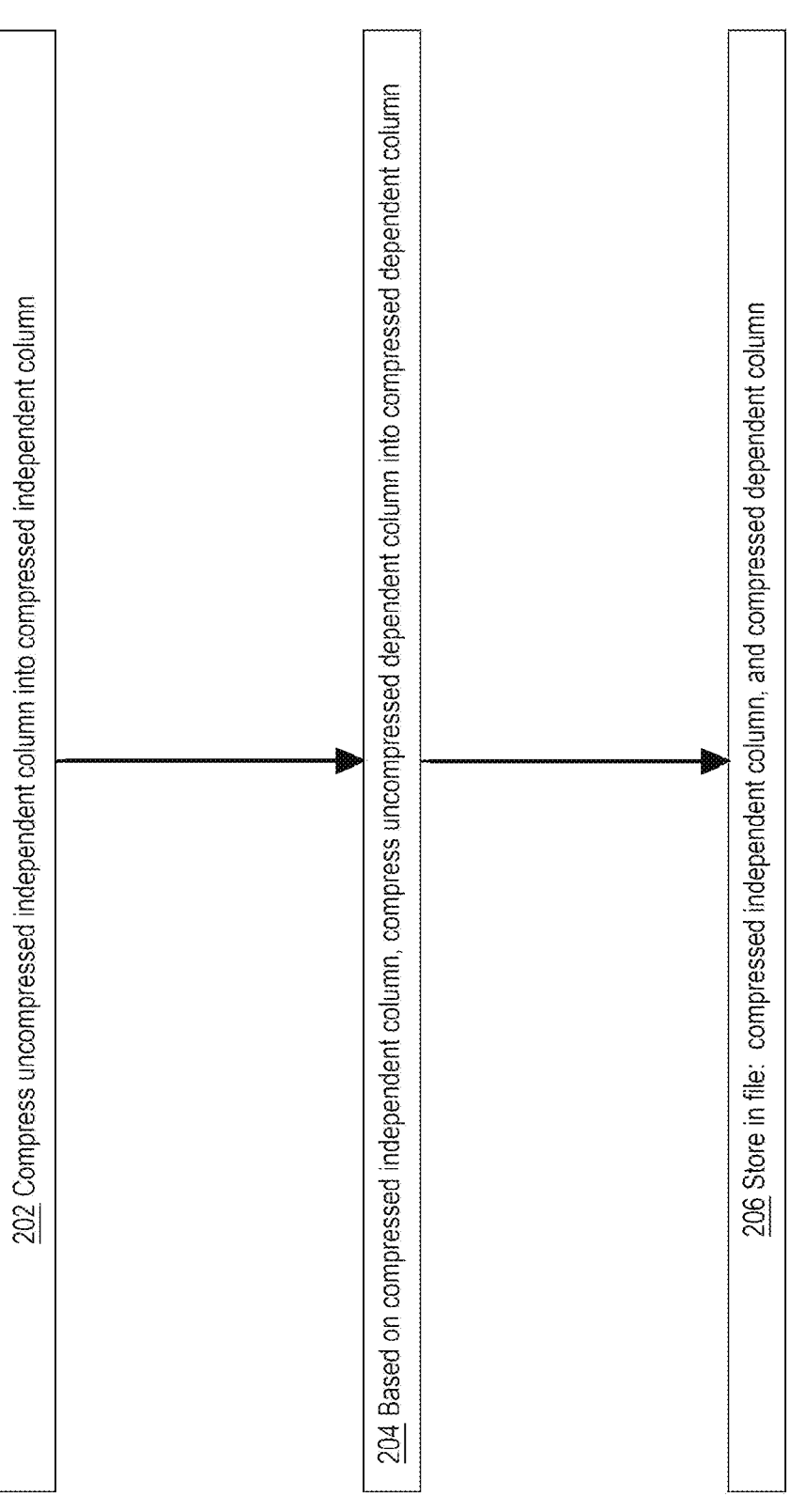
FIG. 2 is a flow diagram that depicts an example process for applying anisotropic compression to a dependent column based on compression of an independent column.

FIG. 2 is a flow diagram that depicts computer 100 applying anisotropic compression to a dependent column based on compression of an independent column, in an embodiment. FIG. 2 is discussed with reference to FIG. 1.

Step 202 generates compressed independent column 140 by compressing uncompressed independent column 110. For example, Snappy compression may be used. As explained in related U.S. patent application Ser. No. 15/907,565, dictionary encoding may entail tokenization. For example, a text document (not shown) may be decomposed into a sequence of tokens (i.e. more or less atomic substrings) that represent individual values as discussed later herein.

For example, whitespace and/or punctuation may be interpreted as delimiters between tokens and, in some embodiments, may be discarded or preserved as discussed later herein. The sequence of tokens may be stored, pipelined, or otherwise processed (e.g. parsed into datatypes as explained later herein) as uncompressed independent column 110. Each token or subsequence of adjacent tokens may be copied or replaced with a reference or dictionary code and then written into compressed independent column 140.

Step 204 generates compressed dependent column 150 by applying, based on compression results of step 202, anisotropic compression to uncompressed dependent column 120. For example, uncompressed dependent column 120 may contain redactions of values that are stored in uncompressed independent column 120. As explained earlier herein, uncompressed columns 110 and 120 may share entropy such that much of the content of uncompressed dependent column 120 may already be symbolically (i.e. not literally) represented in compressed independent column 140. That is, a same portion of compressed independent column 140 may represent corresponding portions of both uncompressed columns 110 and 120. Thus, portions of uncompressed dependent column 120 may be entirely omitted from compressed dependent column 150.

Step 206 writes both compressed columns 140 and 150 into file 130 in a particular way. For example, file 130 may be a Parquet file that has different internal partitions for different columns and/or metadata. Included in the steps of FIG. 3, as discussed later herein, are particular operations for applying step 206 to a Parquet file.

Some or all of steps 202, 204, and 206 may overlap for pipeline parallelism. For example, a first execution thread or processing core may perform step 202, the compression results of which are incrementally available to a second thread or core to perform step 204. The compression results of both steps 202 and 204 may be incrementally available to a third thread or core that performs step 206. For example, writing compressed independent column 140 into file 130 may occur before, during, or after compressed dependent column 150 is generated.

Horizontal (e.g. elastic) scaling may be achieved on a computer cluster. For example, a huge uncompressed independent column may be subdivided into shards (subsequences of values). Each shard may be distributed to a different computer of a cluster.

Each computer of the cluster may treat its shard as an instance of uncompressed independent column 110. Each computer may generate (e.g. redact values from independent column 110) or otherwise obtain a corresponding instance of uncompressed dependent column 120. Each computer may use anisotropic compression as described earlier herein to generate an instance of each of compressed columns 140 and 150, and then persist those two compressed instances into an instance of file 130. Multiple (e.g. distributed) instances of file 130 may each be an individual low level file that operates as a partition or shard of a single huge dataset such as for Parquet and/or HDFS.

3.0 Example Additional Activities

FIG. 3 is a flow diagram that depicts computer 100 performing additional activities for working with dependent and independent columns, in some embodiments. FIG. 3 is discussed with reference to FIGS. 1-2.

Steps 302A-C generate an interdependent pair of uncompressed columns. Step 302A parses text values into typed values. For example, raw text values may be generated by tokenizing a text document as described earlier and later herein. In one embodiment, datatypes of parsed values are indicated in a schema-on-write schema as discussed later herein. In another embodiment, a typed (i.e. parsed) value may be a composite of: a binary identifier of a type, and a binary value for that type. For example, a first byte or first few bits of the composite may be reserved for the type identifier, and the remaining bits or bytes may be reserved for the value.

Original parsing in step 302A is an activity for schema-on-write. Thus, step 302A uses a schema, which is metadata. During various steps in FIG. 3, computer 100 accumulates (i.e. generates without flushing to file 130) primary metadata that describes independent column(s) and secondary metadata that describes dependent columns. The schema becomes part of the primary metadata. Metadata storage is discussed later herein.

Step 302B stores the parsed (i.e. typed) values into uncompressed independent column 110. Parsed values may be homogenous (e.g. all integers) or heterogenous (e.g. integers, floats, dates, times, etc). For example and according to a schema, there may be many compressed and uncompressed columns for values segregated (i.e. homogenous) by datatype or by field. For example, weight and cost fields may have a same numeric datatype, but there may be one column for weight and a different column for cost.

In the case of a heterogenous parsed column, value widths (i.e. amount of bytes) may vary. For example: a) all integers may have a first fixed width, b) all floats may have a second fixed width, but c) first and second widths may differ. Parsing may leave some values unchanged. For example, a string literal has a same value before and after parsing. Each string literal may have its own width. An embodiment may impose a maximum string literal width.

Step 302C stores the raw text values, as discussed for step 302A, into uncompressed dependent column 120. Such strings may: a) be null terminated, b) have expressly indicated respective lengths, or c) be padded (i.e. aligned) to a fixed length.

Steps 304A-B and 306 entail compression and, depending on the embodiment, some metadata generation. Step 304A performs independent column compression, such as previously shown step 202. Step 304B performs dependent column anisotropic compression, such as previously shown step 204.

When uncompressed independent column 110 has multiple dependent columns, such as progressively severe redactions as explained earlier herein, then step 206 applies anisotropic compression to any additional uncompressed dependent columns. For example, a second compressed dependent column is generated from a second uncompressed dependent column.

At each of steps 304A-B and 306, metadata for a respective column may be generated, such as statistical metadata. For example, analyzing parsed values may yield statistics such as minimum, maximum, and mean values. Analyzing unparsed (i.e. raw text) values may yield statistics such as a count of distinct values or a most frequent value. Such statistical metadata is added to either the primary metadata or secondary metadata depending on whether the statistics regard an independent or dependent column.

Writing file 130 occurs during steps 308A-D that may need to occur in the shown ordering, depending on the embodiment, especially such as a Parquet embodiment. The ordering of steps 308A-D may reflect constraints on the internal structure of file 130, such as imposed by Parquet. For example, Parquet requires that the primary metadata (i.e. for independent columns) be placed in a standard footer at the end of file 130.

When the ordering of steps 308A-D is respected, a well formed Parquet file may be written, even if a write once or append only filesystem is used. Some non-Parquet embodiments may necessarily or optionally reorder steps 308A-D. Details of the Parquet file format are presented in related paper "APACHE PARQUET".

Step 308A stores content of independent column(s), which may be any (compressed or uncompressed) column(s) not generated by anisotropic compression. Thus, step 308A does not store dependent columns. Columns stored during step 308A are recognized as columns by Parquet. For example, any standard Parquet reader may read any columns written during step 308A. In that sense, columns written during step 308A are backward compatible.

During steps 308A-B more of the primary and secondary metadata, as introduced for steps 304A-B and 306, may be accumulated (i.e. generated but not flushed to file 130), such as metadata that describes how column content and secondary metadata is written into file 130. For demonstrative purposes, mapping of data and metadata into file(s) is discussed with an example mapping of relational tables to Parquet files as follows.

A relational table (not shown) may have unredacted (i.e. independent) columns and redacted (i.e. dependent columns). A Parquet file may more or less have any size. Thus, all of the independent and dependent columns may be stored into one file 130.

With shredding (i.e. vertical partitioning) each independent column or disjoint (i.e. non-overlapping) subset of independent columns may be written to a separate file 130. Shredding accelerates subsequent analytics because unused columns can be left idle on disk. A dependent column is always written to a same file 130 as the corresponding independent column, and each independent column may have multiple dependent columns. For example, compressed dependent column 150 should reside in a same file 130 as compressed independent column 140.

With sharding (i.e. horizontal partitioning) each disjoint (i.e. non-overlapping) subset of (e.g. adjacent) rows is written into a separate file 130. Sharding facilitates horizontal scaling such as with a cluster of computers. Sharding also accelerates subsequent analytics such as with predicate pushdown. With sharding, records (e.g. documents or table rows) are segregated such as by creation date or by field value.

Data within each file 130 is divided into pages that are tracked in the metadata that computer 100 generates for each file 130. Thus, during steps 308A-B, the primary and/or secondary metadata respectively records which pages of file 130 contain which independent or dependent columns. Step 308B appends content of compressed dependent column(s) into file 130, which may entail a similar layout as step 308A, except on later pages in file 130.

By the end of step 308B, all columns have been stored in file 130, and writing metadata into file 130 may begin. Step 308C appends the secondary metadata, including a manifest of pages used by step 308B, into file 130.

Step 308D appends the primary metadata, including the schema and a manifest of pages used by step 308A, into file 130, which may be formatted as a standard Parquet file footer that can be fully understood by any Parquet reader (i.e. backward compatibility). However, the primary metadata does not include: a) the manifest of pages used by step 308B, which was already written as secondary metadata by step 308C, nor b) a manifest of pages used by step 308C, which means that pages used by step 308C are unaccounted for. Thus, the secondary metadata appears to legacy Parquet readers as wasted (i.e. unused) space in file 130.

Thus, the secondary metadata is hidden from legacy readers. Likewise, because the secondary metadata contains the manifest of pages used for dependent columns by step 308B, the pages for the dependent columns are also hidden from legacy readers. Thus, the dependent columns and secondary metadata are contiguous and in between the independent columns and the footer that are at opposite ends of file 130. Thus to legacy readers, the dependent columns and secondary metadata appear together as a hole in the middle of file 130. Because metadata and anisotropic compressed dependent column(s) are small, the hole is small (i.e. a few pages).

After step 308D, writing of file 130 is finished. A legacy reader may use the footer to normally access the independent column(s). A reader that is enhanced according to techniques herein may access the hidden pages. For example, the enhanced reader may use the secondary metadata to access the dependent column(s). In other words, the enhanced reader may use all of the data and metadata in file 130.

4.0 Document Regeneration from Piecemeal Storage

Figure 4:
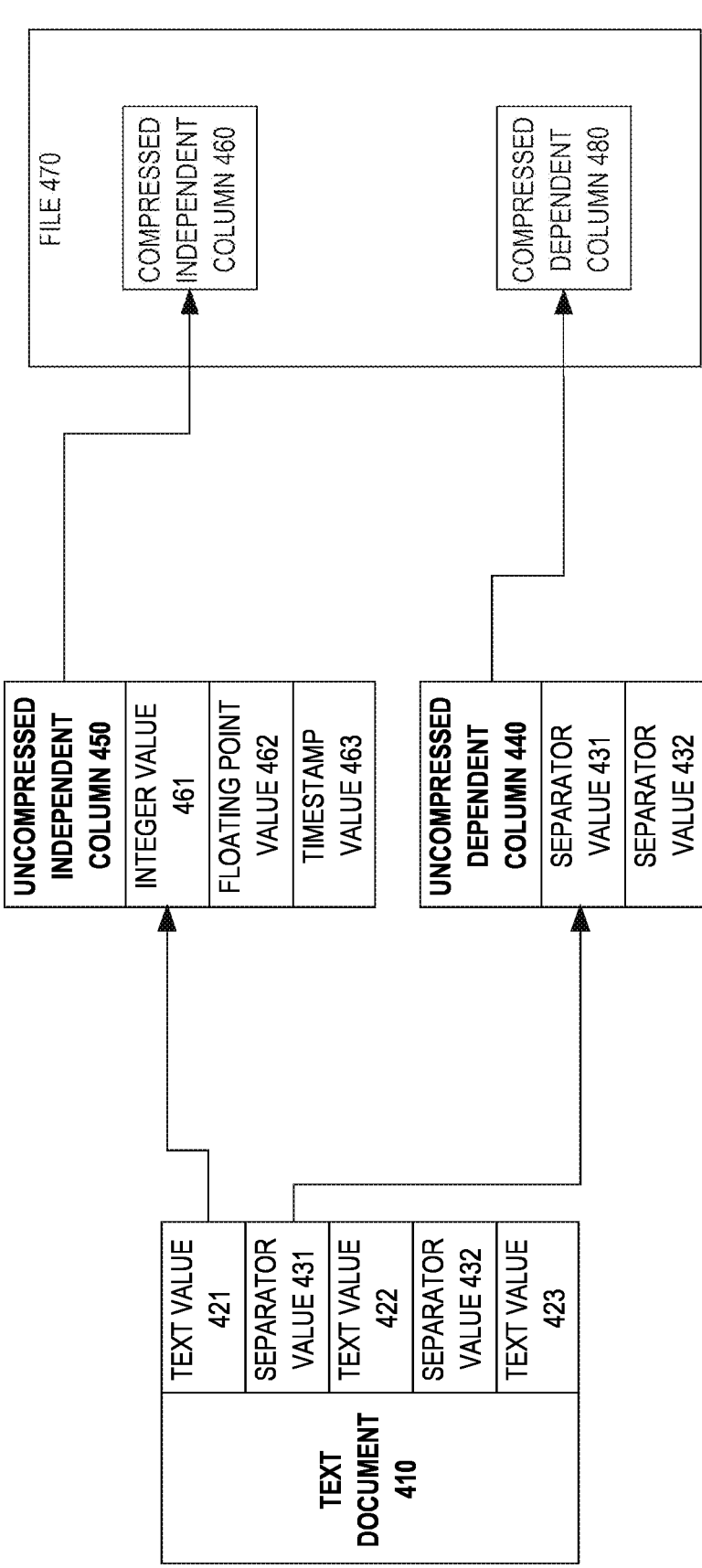
FIG. 4 is a block diagram that depicts an example computer that uses piecemeal storage of a document's values for eventual retrieval in flexible ways such as schema-on-read and document regeneration.

FIG. 4 is a block diagram that depicts an example computer 400, in an embodiment. Computer 400 uses piecemeal storage of document 410's values for eventual retrieval in flexible ways such as schema-on-read and document regeneration. Computer 400 may be an implementation of computer 100.

Document 410 may be a sequence of text characters such as a text file, a log file, a web page, a JSON or XML file, or a binary representation of text, such as a word processor file. Computer 400 tokenizes the monolithic content of text document 410 into a sequence of meaningful text values 421-423 and a sequence of more or less meaningless separator values. Text document 410 itself may contain those values as an alternating sequence of text values and separator values as shown. For example, a comma separated values (CSV) file may store text values separated by otherwise meaningless commas.

A typical separator value may include one or more particular characters such as punctuation and/or whitespace. Interpretation of character(s) at a location in text document 410 may be changed from separator to meaningful text by an adjacent override indicator (not shown) such as quoting or character escaping.

Text values 421-423 are processed differently than separator values 431-432. Separator values 431-432 are directly stored as raw text substrings in uncompressed dependent column 440. For example in text document 410, a first separator is separator value 431 that is stored as a first value in uncompressed dependent column 440 as shown.

Text values 421-423 are parsed into various (e.g. primitive) respective datatypes such as integer value 461, floating point value 462, and timestamp (i.e. date and time) value 463, which are then stored in uncompressed independent column 450. For example text value 421 is parsed and stored as integer value 461 as shown.

Anisotropic compression of uncompressed columns 440 and 450 generates respective compressed columns 460 and 480 that are stored in file 470. Segregation of values in text document 410 into parsed values and separator values may facilitate analytics. For example, semantics of the content of text document 410 may be efficiently analyzed in various ways and at various times by reading only compressed independent column 460.

In any case, boundaries and classification of substrings in text document 410 entails some aspects similar to those of schema-on-write, which is fragile as explained earlier herein. For example, whether or not an XML tag such as </end> is split into three separate tokens </, end, > may depend on the implementation. For example, </ and > may or may not be classified as separators. In another example, $5 may or may not be split into a separator and a number. In another example, a zip-plus-four such as 12345-6789 may or may not be split into a base zipcode and a five character trailing separator such as −6789, which at the time of schema-on-write may be considered a useless suffix.

Classification decisions for which values are or are not separators may be fragile and not meet the needs of a future reader. For example with zip-plus-four, a future reader may decide that the plus-four suffix should not have been a suffix and, further, that the −6789 suffix is not a negative number. In that case, schema-on-read is more or less essential to support future semantics of legacy data.

Example schema-on-read activities are as follows. In a less inconvenient case, a zip-plus-four is tokenized as: a) a base zipcode as text value 421, which is then parsed into integer value 461 and, b) a plus-four suffix as separator value 431. The original zip-plus-four is not stored as a whole value in file 470, but the whole value can be regenerated by decoding values 421 and 431 from respective compressed columns 460 and 480. Thus, potentially only one or two or three values need decoding to regenerate an original value.

In a more inconvenient case, many or all values in compressed columns 460 and/or 480 may need decoding. In a worst case, text document 410 needs complete regeneration, which anisotropic decompression facilitates for schema-on-read and other purposes. For example, an audit or other presentation may expect whole text document 410 at any time in the future, even though text document 410 may have been deleted after anisotropic compression.

Thus, file 470 is a functional equivalent of original text document 410 and is enhanced for semantic (e.g. strongly typed) analytics. For example, text document 410 might not have had a schema. Whereas, file 470 may contain a (i.e. schema-on-write) schema. Thus, file 470 may be self describing even if text document 410 is not.

In that sense, persisting only file 470 (and not text document 410) may be more useful than persisting only text document 410. For example, text document 410 may be more aggressively evicted from a cache and/or more aggressively purged from a backing store. For example, regeneration facilitates not persisting text document 410 at all. Furthermore, file 470 is usually smaller than text document 410, in addition to being more useful.

5.0 Example Regeneration Process

Figure 5:
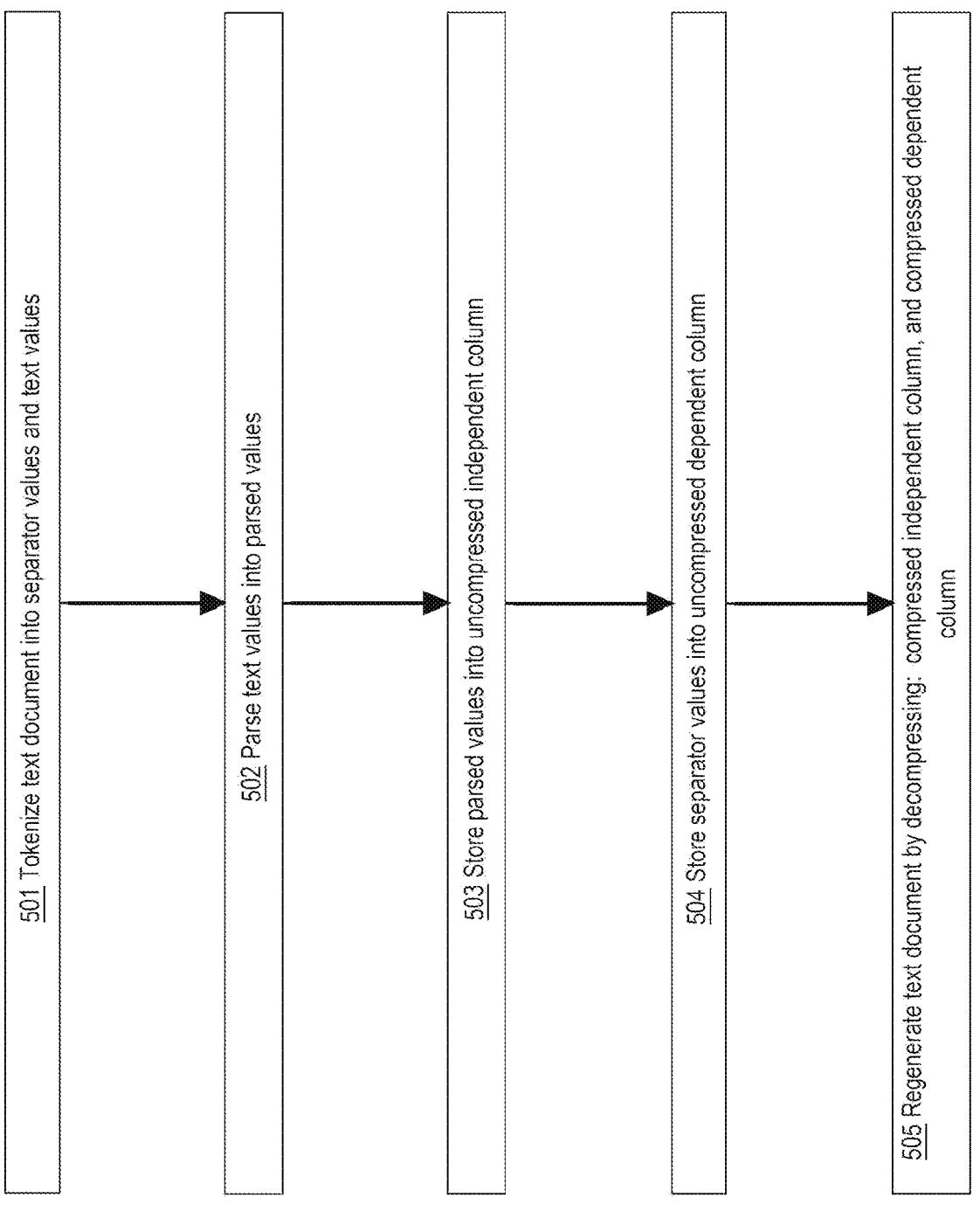
FIG. 5 is a flow diagram that depicts an example document regeneration process.

FIG. 5 is a flow diagram that depicts computer 400 using piecemeal storage of document 410's values for eventual retrieval in flexible ways such as schema-on-read and document regeneration, in an embodiment. FIG. 5 is discussed with reference to FIG. 4.

Step 501 tokenizes text document 410 into separator values 431-432 and text values 421-423 as discussed above. Step 502 parses text values 421-423 into parsed values 461-463 that are strongly typed as discussed above. Steps 501-502 may be more or less combined such as with a scanner/parser library such as Lex with yet another compiler compiler (YACC).

Step 503 stores parsed values 461-463 into uncompressed independent column 460. In an unshown embodiment such as with Google Dremel, parsed values are segregated by field and/or type. For example, the three parsed values 461-463 may be segregated into three different homogenous uncompressed independent columns (not shown). Field processing for Parquet with Dremel is discussed further in related paper "DREMEL MADE SIMPLE WITH PARQUET".

Step 504 stores separator values 431-432 into uncompressed dependent column 440 as discussed above. Additional activities (not shown) occur between steps 504-505. These additional activities include writing file 470, possibly deleting document 410, and receiving a request to retrieve document 410. That request may cause step 505.

Step 505 regenerates document 410 by decompressing both of compressed independent column 460 and compressed dependent column 480. Decompression regenerates parsed values 461-463 and separator values 431-432. Parsed values 461-463 are then rendered as text values 421-423. Text values 421-423 and separator values 431-432 may then be interleaved (i.e. alternated) as shown for document 410. In that way, document 410 is regenerated.

6.0 Security

Figure 6:
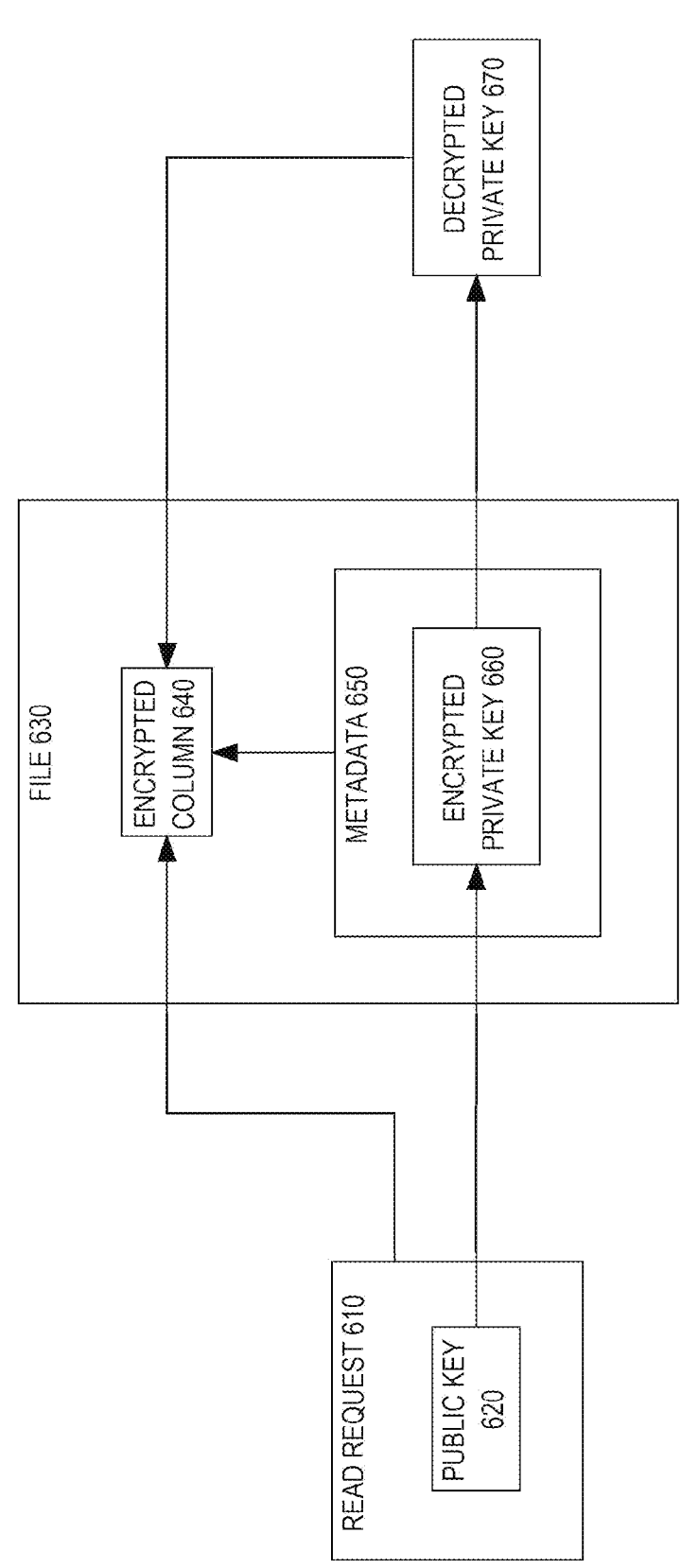
FIG. 6 is a block diagram that depicts an example computer that increases security by hiding an encryption key needed to read an encrypted column.

FIG. 6 is a block diagram that depicts an example computer 600, in an embodiment. Computer 600 increases security by hiding an encryption key needed to read an encrypted column. Computer 600 may or may not be an implementation of computer 100.

As explained earlier herein, anisotropic compression is suited for redaction, which increases privacy and security. Compressed column(s), such as 640, are stored in file 630. Any compressed column, whether dependent or independent, may be encrypted for increased security. In an important use case: a) compressed column 640 is an encrypted independent (i.e. unredacted) column, b) a compressed dependent (i.e. redacted) column (not shown) may or may not be encrypted, and c) if both compressed column are encrypted, then each is encrypted with a separate key.

Depending on the embodiment, an encryption key (e.g. 620 or 670) may be a symmetric key such as advanced encryption standard (AES), an asymmetric key such as Rivest Shamir Adleman (RSA), and/or an elliptic curve (ECC) key. When key 620 and/or 670 is asymmetric, then that key may be a public or private key, depending on the embodiment. In some asymmetric embodiments such as shown, a particular public key (not shown) is used for encryption of compressed column 640, and private key 670 is used for decryption of compressed column 640.

In the shown embodiment, at least two keys (i.e. 620 and 670) are needed to decrypt compressed column 640. In the shown embodiment, a DBMS (not shown) mediates decryption as follows. To the DBMS, a client (not shown) may send read request 610 that contains a credential of a user or a role, such as public key 620. The DBMS may use public key 620 to decrypt encrypted private key 660 that is stored in metadata 660 in file 630. By that decryption, the DBMS obtains decrypted private key 670 that the DBMS uses to decrypt compressed column 640.

In an embodiment not shown, public key 620 is not contained in read request 610, but is instead hidden in the DBMS itself. For example, the DBMS may contain public keys that the DBMS associates with respective users or roles.

Regardless of whether a user or the DBMS keeps public key 620, file 630 contains encrypted private key 660 in metadata 650. Metadata 650 may have an embedded keystore that contains multiple encrypted (e.g. private) keys. In an embodiment, file 630 may contain multiple (e.g. independent and/or dependent) encrypted columns, and the keystore may contain a different key for each encrypted column. For example, a different public key may be needed to decrypt each private key.

In another embodiment, subsets of private keys (e.g. for different encrypted columns) are encrypted together, such that public key 620 may decrypt the subset of private keys to gain access to multiple encrypted columns. For example, public key 620 may be associated with a role that has access to the subset of encrypted columns. For example, different roles may have different public keys that decrypt different (e.g. overlapping) subsets of private keys for different (e.g. overlapping) subsets of encrypted columns.

Depending on the embodiment, such mapping of roles or users to encrypted columns may or may not be fragile (i.e. broken by evolving security needs). For example, access to a particular encrypted column may eventually be granted or revoked for a particular user or role. In a robust (i.e. not fragile) embodiment, which encrypted columns are grouped into which subsets may be redefined by replacing (i.e. overwriting in metadata 650 in file 630) an old version of a keystore with a new version.

For example, the new version of the keystore may add or remove a role or a user and/or add or remove an encrypted column from a particular subset. Generating the new version of the keystore does not require: changing which compressed columns are encrypted, nor generating or discarding a key.

Thus, keystore evolution may adjust metadata 650 without disturbing any compressed columns in file 630. Thus, the new version of the keystore may be quickly imposed without overhead (e.g. latency) of reprocessing compressed column(s). In other words, content as originally recorded (i.e. compressed and encrypted) remains valid despite evolving security.

7.0 Example Security Process

Figure 7:
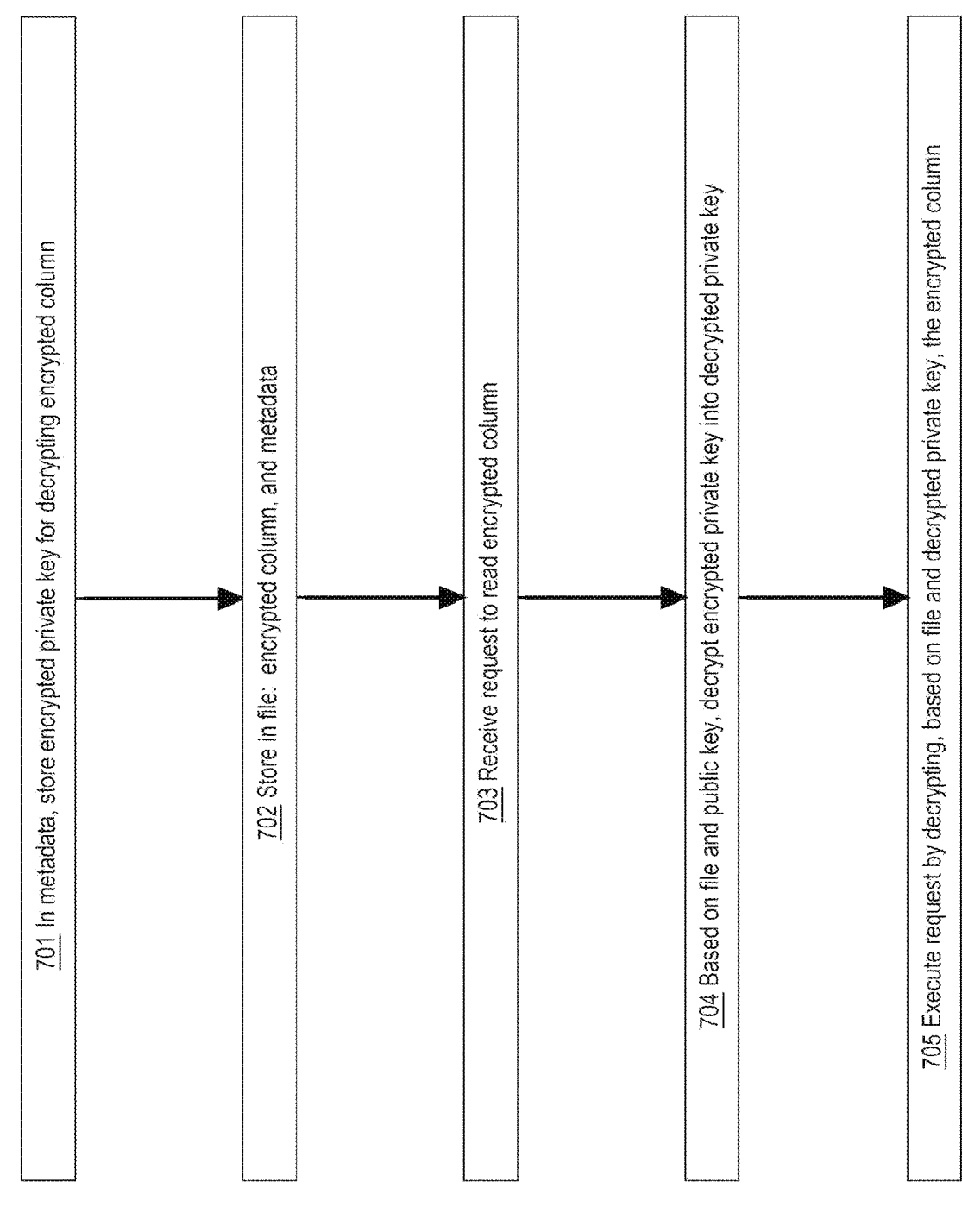
FIG. 7 is a flow diagram that depicts an example process for increasing security by hiding an encryption key needed to read an encrypted column.

FIG. 7 is a flow diagram that depicts computer 600 increasing security by hiding an encryption key needed to read an encrypted column, in an embodiment. FIG. 7 is discussed with reference to FIG. 6.

In metadata 650, step 701 stores encrypted private key 660 for decrypting encrypted column 640. For example, metadata 650 may contain an embedded keystore that associates encrypted private key(s) with encrypted column(s).

In file 630, step 702 stores encrypted column 640 and metadata 650. Because a standard Parquet file footer (not shown) does not accommodate a keystore, metadata 650 is not stored in the standard footer, but is instead stored in the hidden (i.e. secondary) metadata as discussed earlier herein. After step 702, writing file 630 finishes, and file 630 is ready to use.

Step 703 receives request 610 to read encrypted column 640. Based on file 630 and public key 620, step 704 generates decrypted private key 670 by decrypting encrypted private key 660. Depending on the embodiment, public key 620 resides either in read request 610 or in a DBMS (not shown) that is hosted on computer 600 for managing whatever dataset (not shown) that file 630 is part of. For example, the DBMS may use an identity of a user that sent read request 610 or an identity of a role of that user to look up public key 620 such as in a lookup table or database dictionary that is part of the DBMS.

Step 705 executes read request 610 by using file 630 and decrypted private key 670 to decrypt encrypted column 640. Thus, read request 610 has access to the content of encrypted column 640.

8.0 Example Parquet Implementation

The following is an exemplary implementation of techniques herein. This particular implementation is based on Parquet and Thrift as introduced earlier herein. Some possibly optional features of this implementation are based on Oracle and Dremel as introduced earlier herein.

8.1 Column Store and Apache Parquet Relationship

Regardless of whether or not a standard Oracle DBMS includes a column store, this implementation has a DBMS that operates a column store for persistence of data columns in Parquet files that are enhanced as discussed above and below herein. The column store file format is based on the Parquet file format, and is fully compliant and therefore backward compatible with Parquet. The features of the column store are delivered using the column store extra data stored in spare pages within Parquet containers.

Parquet is a Columnar (i.e. column major, column vector) data format that is popular in the Hadoop community. It is strictly a Schema-on-Write format, and relies in ahead-of-time ETL. Therefore, Parquet is not capable of supporting Schema-on-Read. The Parquet format has optional partitioning based on data values, such that a column is grouped by value(s), and each value group may reside in its own Parquet file, in a Parquet file with other groups of a same column, or in a Parquet file having multiple columns of a same (e.g. relational) table. In an embodiment, a relational database management system (RDBMS) stores a partial, entire, or multiple column(s) of a relational table into a column vector in memory or in a columnar file.

In the innovative format disclosed herein, all of the above new features are delivered without any compromise to backward compatibility of the file. In particular, the features continue with full backward compatibility where old generation Parquet readers in the Open Source can access original features and behavior without any problems, but not new features disclosed herein.

Enhanced reader is able to engage the additional features, including such important features as: a) the faithful (i.e. high fidelity, lossless) unzip of row-major data is delivered while still retaining the column-major layout of the file for accelerating Schema-On-Write (SoW) queries with Columnar IO avoidance, b) the resulting single the column store file, which is capable of supporting both SoW and Schema on Read (SoR) use cases at the same time, can replace two files in storage, namely a Parquet file and a text file, and yet is only as big as either one of the two, and c) support self-auditing and provenance validation of the files by a combination of faithful unzip and digital signature validation.

Implementations herein are much more full-featured and have additional advantages compared to the Open Source solutions due to various benefits of integrating the Oracle developed Anisotropic Compression algorithms. This patent disclosure explains the particular ways in which (1) the Parquet file format has been modified and the user-requirements have been interpreted in a innovative manner so as to support the new user-visible features and (2) the particular new algorithms introduced into the Parquet implementation to successfully integrate Anisotropic Compression into a deliverable solution.

Column stores herein should not be seen as a simple enhancement of Parquet or other columnar formats. Instead it is a packaging of output from the Nymbl algorithm into the (e.g.) Parquet container format. This is done in such a way that one partition of the resulting file is virtually indistinguishable from Parquet to unmodified standard Parquet readers, thus giving rise to backward compatibility with Parquet readers. However, this similarity is merely superficial.

The output compression stream format is standard, but the compression algorithm is innovative. The compression algorithm is not standard Google Snappy (a.k.a. Zippy), but instead is Nymbl compression which implements the Anisotropic Compression algorithm and facilitates Secured data representations. However, the compressed stream output by Nymbl appears indistinguishable from a Snappy produced stream to an unmodified Parquet reader, which gives rise to the backward compatibility.

There is a second partition of the file which is typically hidden from standard Parquet readers. When the second partition is used in combination with the first partition, innovative technologies herein may engage.

Due to the compression innovations from Nymbl, the hidden extra Enterprise Partition is very space efficient. The total of the the column store file comprised of the two partitions (i.e. the Parquet partition for Columnar Schema-on-Write plus the enhanced Extra partition containing Unzip, Schema-on-Read, and Secured data capabilities) does not typically exceed the size of the original source file that the two are derived from.

The sections that follow describe the wire-format and layout of the column store file, its compliance with Parquet layout for perfect backward-compatibility, and the additional data and meta-data that is required to unlock the new features.

8.2 Column Store Modes of Access

A column store file can be accessed in one of three different modes:

Mode A: or Standard, Parquet backward-compatible Schema-on-Write mode. In this mode, the functionality provided is indistinguishable from standard Parquet readers. It uses standard Parquet wire encodings and standard decompression libraries (even though the data streams might have been compressed using the Nymbl compression algorithm, the resulting compressed stream is fully backward compatible).

Mode B: or Enhanced Schema-On-Write mode. In this mode, the additional representations are unlocked by using the enhanced Nymbl decompressor, instead of the standard de-compressor library. This mode also supports unlocking Secured representations (ie. "un-redacted" or "un-masked" data) if the query has the correct security credentials and is able to provide the requisite keys as discussed later herein.

Mode C unzip: unzip mode, is a special case of Mode C access, where the entire file is decompressed to faithfully reconstruct the original source file.

Mode B and Mode C are typically engaged only by column store readers, while Mode A (i.e. backward compatibility) can be accessed equally both by column store readers as well as all existing Parquet readers.

8.3 NYMBL Anisotropic Compression Overview

Anisotropic Compression is an innovative enhancement of the standard compression algorithms, developed at Oracle. In anisotropic compression, multiple (i.e. plurality of) data streams are compressed simultaneously; compare to standard compression algorithms which only compress one data stream at a time. In the cases where these multiple streams to be compressed are related to each other, or even are in fact derived from each other, then anisotropic compression is able to compress these multiple streams into a resulting disk footprint which is not much bigger than the disk footprint occupied by the compressed image of any one of the plurality of input streams to be compressed. Thus, for Nx different representations or encodings of the same logical data, the footprint after anisotropic compression is of the order of 1×, i.e. of the compressed size of any of the representations or encodings, and not N of them. That is a linear improvement of effective compression ratios and consequent reduction of disk footprint and storage recurring and life-cycle maintenance costs.

For the purpose of this disclosure, it suffices to consider the above summary of anisotropic compression and observe one specific requirement of anisotropic compression algorithm which is not present in regular compression algorithms. This is the requirement that in anisotropic compression, each data stream, or buffer, is also required to provide a method or mechanism for atomization of the buffer or stream so that shared entropy can be correctly and efficiently extracted during compression. The specific manner in which this atomizer function is implemented in the context of Parquet data types and encodings is one subject matter of this disclosure.

Anisotropic Compression itself and related algorithms are disclosed in related US patent application "Entropy Sharing Across Multiple Concurrent Compression Streams" that is cited above. In this particular disclosure, the innovation is the manner in which Anisotropic Compression has been adapted so that the above discussed goals of column store files may be fulfilled.

Nymbl is a new and improved compression algorithm that is used in the column store. Nymbl is a new algorithm, but not a new compression format. Nymbl produces an output stream that is exactly compatible with industry standard compression algorithms including snappy, zlib/gzip, or zstd. Nymbl compression may be a foundation over which different features of the column store are implemented, such as: multiple representations (for CPU speedup for SoW queries), and fine-grained file based access control (for role-based access control, redaction, and masking). Nymbl differs from traditional compression algorithms in one very important way. Traditional compression algorithms take in one source stream and produce one output stream that is compressed to a fraction of the size of the source stream. Nymbl instead takes a set of N related source streams, and produces an output stream which has one primary and (N−1) secondary or dependent streams. The primary compressed stream is perfectly wire-compatible with standard compressed formats, and can be read and decompressed by any standard decompression library.

The secondary streams are typically very small in size and add very little to the total size of the compressed stream compared to the compressed size of just the one primary stream. Essentially, N streams may be compressed into a space that is not much bigger than that required for compressing just one stream. This is true for all streams that are related and for all data that has typical compression ratios that are encountered in database workloads. This property of Nymbl is where significant space savings and compression benefits of the column store arise from.

8.4 Enhanced Features Delivered with No Compromise of Backward Compatibility

Metadata is encoded in an innovative way. The Parquet metadata and file layout has been modified such that complete backward compatibility is unconditionally maintained. Older generation readers will notice no difference from older format files and will deliver no more than older functionality. New enhanced reader software can engage the new features and deliver new functionality. At the same time, only one copy of the data is in the file even though the file has two distinct facets, behaving almost as though it were two files one of each format, and yet, the size of the one resulting combined file is no bigger than the larger of the two original files.

The column store metadata is placed in a new footer that immediately precedes the standard Parquet footer that is at the end of the file. The way this placement results in this enhanced footer being invisible to the standard Parquet reader. This footer in turn opens up access to other data pages in the file which are therefore not accessible from the standard primary footer. Thus, a hidden partition in the file is created, which is hidden in the sense that it is not even visible to the standard Parquet reader. This ensures complete backward compatibility of the file with existing Parquet readers in the Open Source. At the same time, by chasing and following the pointers from the hidden enhanced footer, the Enhanced reader is able to access all the extra "Enterprise" data pages and unlock the new features.

8.5 Atomization Based Compression

Novel buffer atomizer methods required by Anisotropic compression are integrated into buffers with Parquet data types in an innovative way. This enables multiple features, not only those discussed above, but also improved compression ratios and: a) on-disk materialization of Oracle Numbers for negligible additional disk footprint, b) redaction, column, row and field based fine-grained server-less in-file access control with negligible additional disk footprint, and c) grantable and retractable role and user-based access privileges to file data, without any file re-writes. Atomization occurs during compression, which needs raw values emitted by atomization. Each atom of raw data is extracted according to its Field width, but no field type is imposed (i.e. raw bits are uninterpreted).

For each column of data, whether it is in the primary/open Parquet partition or in the secondary/hidden Enterprise partition, anisotropic compression is used in such a manner as to allow each column to support multiple representations. This is done such that it is without change to the user schema. The existence of the additional representations does not foist upon the user additional superfluous or duplicated columns. The number of logical columns does not change. And also, it is important to note that the disk footprint of that column after compression is also substantially same. Instead, when a column data is uncompressed, depending on who is requesting the data, entirely different representations, encodings, or redacted and unredacted values may be returned from the same disk footprint.

Anisotropic Compression requires an annotation of the data buffer with an atomizer method. The way this method is implemented is such that it returns to the caller the necessary field and value boundaries in an inexpensive manner, without incurring additional CPU overhead. This has been innovatively done specifically for the particular data encodings in Parquet. For int32, int64, int96 and float, the atomizer function returns a constant offset unpacking plan, which is determined by the offset of the data type. For strings and binary data, the atomizer returns an offset and length operator in a manner suitable for use by the Anisotropic Compression algorithm. This integration is specific to Parquet data types such that Anisotropic Compression can actually be successfully integrated into Parquet.

8.6 Progressive Privacy

Redaction and Tokenization algorithms which allow the customer/user to select the tradeoff between complexity and security needed. This includes: a) simple redaction based on pattern substitution, and b) tokenization using an external service, which allows for secured reversibility by privileged users.

Depending on user specification, if any column redaction is specified, then an algorithm applies security and access control to all other representations of the same column. Note that since redaction is a "negative feature", it removes something from the data, as opposed add new information, the "addition" of redaction to a column creates a representation which is poorer (i.e. lossy), and only the original representations need to be fully protected.

A major innovative aspect of the integration in this disclosure is an algorithm that from a simple user specification of redaction, which is expressed in declarative logic, an operational, imperative, and optimized plan is derived for which paired alternative representations would be actually secured.

In an innovative way, the user declares an external open database connectivity (ODBC) service, such as a Java database connectivity (JDBC) service, that can be used to maintain a persistent tokenization and de-tokenization logbook that records which naturally occurring identifiers within payload data are assigned which unique tokens for anonymization (i.e. privacy). This logbook mechanism is advantageous compared to all other mechanisms because it results in consistent and repeatable tokenization which can be simultaneously secure as well as reversible in a consistent manner when different files are written and read by different instances of writers and readers in a cluster or distributed data-center. For example, an opaque text or integer token may replace a sensitive personally identifiable field value such as a person's name, social security number, and/or postal address. That token can be globally (i.e. across multiple parquet files and/or external silos) used as a substitute identifier or relational key, such as a primary or foreign key.

8.7 Tamper Resistant Provenance

The enhanced metadata has a Provenance record with digital signatures and information of the ingest process and parameters. A digital signature uses asymmetric cryptography to provide creator authentication, non-repudiation, integrity (i.e. tampering detection). An embodiment may use the standard digital signature algorithm (DSA) or other digital signing techniques based on underlying technologies such as cryptographic hashing, cyclic redundancy code (CRC), checksum, and Rivest-Shamir-Adleman (RSA). Embodiments may sign payload data, metadata, or portions thereof.

8.8 Apache Parquet Standard File Format

Parquet is a hybrid-columnar file format optimized for big-data applications in the Hadoop ecosystem. Parquet is typically used with (and optimized for) a Hadoop filesystem (HDFS) or Cloud Object Stores. The Parquet file format is documented in the Apache Project pages. https://parquet.a-pache.org/documentation/latest/. The entire format described in the Parquet documentation is consistent with the column store, and therefore is incorporated here by reference. A brief synopsis of the Apache specification follows.

The file starts with a 4 byte magic string, in US-ASCII, with the value "PAR1". Likewise, the file also ends with the same 4 byte signature, in US-ASCII, again with the value "PAR1". Parquet files commonly reside in HDFS and Object Store file systems which are append-only, write-once, read-many file systems.

These file-systems typically do not allow a writer to seek backwards in the file during write. Therefore, Parquet has made the choice to write the metadata, which is traditionally written in a file header, instead into a file footer. Details of the Parquet file format are presented in related paper "APACHE PARQUET".

8.9 Apache Parquet Metadata Block

The last and second to last words in the file each consist of four bytes. The second to last word from the end of the Parquet file, just before the four byte magic-number signature ("PAR1"), specifies a length of the file metadata.

Continuing in the order from the end of the file backwards to the beginning, the file metadata block then immediately precedes the file metadata block length word. A typical Parquet reader would open the file for reading in the following manner.

1. The reader seeks to the end of the file, to first verify the signature word "PAR1".
2. The reader reads the next word of four bytes, and interprets that as an integer, giving the length of the metadata block.
3. The reader seeks backwards in the file by that many bytes, and reads the file metadata block.

All of this behavior is retained exactly so also in the column store, both in the location of the footer metadata, and also in the very fact that the primary footer is exactly a Parquet footer and no more, and no different.

The file metadata contains a Thrift encoded structure which details the schema with which the file was ingested, and pointers to the offsets of the column chunks within the file for each leaf in the schema. A leaf is any field in a schema that has a primitive type (i.e. not compound). The schema in Parquet allows hierarchical structures, and also allows elements in the schema to be either required or optional. Encoding of nested columns, such as for hierarchical content, is further discussed in related paper "DREMEL MADE SIMPLE WITH PARQUET".

Parquet only supports a-priori fixed depth and shape of nesting, as this is limited by the ahead-of-time declared schema for the file. Therefore the number of leaves of the schema, and hence the number of columns are also fixed and strictly enumerable a-priori.

8.10 Apache Parquet Row Groups

Payload data in a Parquet file is organized into a series of rows in the given schema. The rows are logically concatenated with an implicit order, though generally no semantics is specified in the standard about the row-order. Rows in Parquet are grouped into Row Groups, such that all the data for each Row Group, for each Column Chunk within that Row Group, roughly fits into an expected Page Size.

The Page Size is typically matched to the expected block size in the underlying HDFS or other file-system, which is typically 64 MB, 128 MB, or 256 MB. This match is closely (but not strictly) honored, though there is no requirement for it to be exactly so for all row-groups. During Row Group assembly, the size of the currently accumulated and compressed Pages are tracked and the Row Group is closed when the Page sizes reaches the specified target threshold which matches the expected block size of the underlying HDFS file system.

8.11 Apache Parquet Column Chunks

Each Row Group contains a number of Column Chunks, one for each Column in the data. A Column in the data typically corresponds to each potential leaf in the schema associated with the data. This schema is known a-priori, during ingest time, and is embedded into the metadata in the file. That makes Parquet a purely Schema-On-Write file format, along with the fact that the data values are also binary encoded. This makes Parquet a "post-ETL" file format, and therefore cannot be used to support any Schema-On-Read queries or "unzip to original", since the ETL process (in particular the E and T stages, or Extract and Transform) is information lossy, and discards parse information from Extract (including key order for key-value pair data, such as JSON) and pre-Transform original textual data representations.

A Column Chunk consists of a series of Pages, each Page roughly corresponds to the target Page Size. Each Page in a Column Chunk starts with a Page Header, and a concatenation of three blocks of data. They are the Repetition Level, Definition Level and a block containing all the Values (i.e. payload). Repetition Level and Definition Level data are optional and specified in the schema. The Values block is always required.

If a column is not nested (i.e. the path to the column has length 1), Parquet does not encode the repetition levels (it would always have the value 1). For data that is required, the definition levels are skipped (if encoded, it will always have the value of the max definition level). For example, in the case where the column is non-nested and required, the data in the page is only the encoded values.

The Column Chunk may be a concatenation of a series of Pages. Each Page is a unit of IO (e.g. disk block) and can be individually tracked from the metadata. Thus, Pages that are not required need not be read from disk. The metadata also can optionally contain storage indices, namely Minimum and Maximum Statistics for the actual values for that Column Chunk. In an embodiment, this applies only for Columns which have numeric data. This can be used to decide whether that Page has any Values that are in the range of interest for a given query, assuming such query pushdown is available.

8.12 Column Store Enhanced Partition

A major innovative aspect about the column store file wire-format involves an observation about Parquet format that supports introducing safely hidden extra pages. This is derived from the above structure of the Parquet file format, which allows that Padding is permitted in a Parquet file. Though most Parquet writers do not appear to introduce deliberate padding, however, all Parquet readers fully support such padding since their operation is strictly bound to the pointers in the Parquet footer. For example, a standard Parquet reader simply skips (i.e. ignores) padding.

The column store file contains a partition of column store extras. This extra column store metadata is hidden from the Parquet readers by using an auxiliary metadata structure.

The column store extra partition is a logical entity which is dispersed among normal Parquet Column Chunks; it is not necessarily a physically contiguous extent of the file in terms of byte ranges. Typically, the column store pages that correspond to the rows in a particular Parquet Row Group would be found co-located with the Pages that contain the Parquet Column Chunk for that given Row Group.

However, all the column store Pages and Column Chunks can only be accessed by following the offsets and pointers in the column store metadata footer. There are no pointers in the Parquet metadata footer which can point to any of these column store data Pages; therefore these Pages remain completely hidden, and might only superficially appear to a standard Parquet reader essentially as orphaned or unreachable and dead padding Pages within the Parquet file, which a standard Parquet reader can simply ignore.

The column store metadata is a strict superset of Parquet metadata; everything in the Parquet metadata is duplicated in the column store metadata, while the schema is extended by one more level and additional information is also added.

In an embodiment, the Parquet feature set and the column store feature set are kept completely separate. In another embodiment, the column store metadata is merged into Open Source Parquet metadata, and the two features sets can be combined and/or harmonized.

8.13 Apache Parquet Standard Partition

The Parquet Standard Partition consists of all the Column Chunks, and therefore Pages, which are reachable from the Parquet metadata footer. It does not include any of the byte ranges which are not reachable from the standard Parquet metadata footer. This partition strictly follows, without restriction, all the rules of standard Parquet encoding described in the section above. For Mode A access, i.e. standard mode backward-compatible Schema-on-Write access of data in a column store file, the Parquet partition suffices completely. It is read and serviced in the standard way, as in Parquet.

8.14 Column Store Enhanced Partition

The set of Column Chunks, and therefore Pages, which are not reachable from the standard Parquet metadata footer, but are in fact reachable from the column store metadata footer, constitute the logical column store partition. The column store partition is essential for Mode B (enhanced Schema-on-Write) and Mode C (unzip) access. However, it must be noted that the column store partition is not stand-alone, and it alone cannot be used for enhanced access. It is always used in addition to portions from the Parquet partition.

A major innovative aspect of column store arises from how Anisotropic Compression is used to eliminate redundancy between the Parquet partition and the column store partition. This means that the resulting file size is not a doubling of the file, counting the Parquet partition supporting Schema-on-Write, and the column store Extra partition supporting unzip and Schema-on-Read. Instead the resulting file is typically only about the same size as the original text file compressed using a comparable algorithm.

Anisotropic compression is innovatively applied between Parquet columns and those column store representations which they are paired with. This technique is used effectively so that any information (more specifically information entropy) that is already contained in the Parquet partition is not duplicated in the column store Extra partition.

Therefore, decompressing a page from a secondary or dependent column store Extra partition may require that the corresponding primary compressed stream from the Parquet partition be accessed as well. While this is an additional Page of data being read, the total amount of data blocks read from disk is roughly the same as the number of data blocks read from disk if the secondary representation were to be natively compressed as a single representation in a comparable standard compression codec.

8.15 Column Store Row Groups

Column store Row Groups are identical as, and one-to-one aligned with, Parquet Row Groups. The column store introduces additional Column Chunks for the same set of rows in any given Row Group. These additional Column Chunks are in the column store Extra partition and are hidden from the Parquet partition. These additional Column Chunks do not necessarily contain new Columns. Instead they typically contain additional secondary representations of the same Columns whose primary representations are in the Parquet partition. These secondary representations are compressed using Nymbl, and they are typically very small since they are dependent on the primary representation (which might be snappy compression format) in the Parquet partition.

It is permissible that a Representation in the column store partition does not have any primary representation in the Parquet partition. This would happen when a Column has not been ingested according to the Parquet schema, but still belongs to the column store schema, (which is a superset).

In general, by default, every Column in the Parquet partition would have at least one paired Representation in the column store partition which is the original text fragment from which the value was converted. This applies no matter what integer or other binary format the text fragment has converted into during Transform step of ETL in Parquet ingest. This representation is named the "zipzag" representation.

Innovatively, by default, there would always be found a "zipzag" representation for every column, and in fact every parseable leaf in the source file. Further, it is always the case that every octet in the source file is always to be found in one, exactly one and only one "zipzag" stream in the column store partition. The unzip and Schema-On-Read functionality is built upon this invariant assertion. However, the zipzag stream when compressed by Nymbl can potentially have a very small disk footprint since Nymbl shares entropy in this compression stream with the entropy in the primary representation already in the Parquet partition.

Note that it is permitted for the user to disable (i.e. prevent) the "zipzag" representations during ingest. Such a column store file would not be capable of Mode C (Schema-on-Read and unzip) access. Mode B or enhanced Schema-on-Write access would still be possible if additional binary representations (such as Oracle Numbers) are encoded. However, this is also optional. If both the above are absent, then the column store file is exactly identical in features and capabilities to Parquet (except perhaps there is an additional vestigial and likely useless metadata in the footer).

8.16 Column Store Extra Column Chunks

Column store Extra partition contains additional Column Chunks. As explained above these may or may not be dependent on corresponding primary Column Chunks in the Parquet partition.

8.17 Columns and Representations

Column store defines Columns and Representations in a specific way. Columns are vertical projections on fields in ingested data, which is in the context of some specified ingest Schema, being applied as Schema-On-Write. A Column is specified in the user schema, and is also a property of standard Parquet. Representations on the other hand are (rules or types for) concrete encodings of Field Values of a Column. For example, Parquet native data types such as int32 are representations, while the zipzag stream which contains the corresponding source text fragments is another potential representations of the same column. Oracle Numbers might be another common representation.

Typically, different Representations of one single Column are expected to be actually derived from one another, or very closely related to each other. But this is not a mandatory requirement, and can be violated without functional failures, but still it is a common and useful thing to do. Furthermore, Anisotropic compression with Nymbl gives high compression ratios only in such cases, because the relationship assures a high certainty of shared entropy between the different representations which are being compressed together.

8.18 Zipzag Representations

Zipzag Representation chunks are typically secondary to their corresponding primary column Representation in the Parquet partition. It is possible for the primary (ie parent) of a Zipzag Representation to be another representation in the column store partition. This would occur when some column is included in the column store schema, but not included in the Parquet schema. The other direction is not possible, because the column store schema is a strict super-set of the Parquet schema; any column in the Parquet schema is always present in the column store schema in one or more representations. The Zipzag representation is encoded in the wire content as a Parquet binary data type, or string type.

8.19 Chaff Column

Chaff is defined as the "junk" that is present between useful values in the original file. It is typically discarded by the Extract step in ETL processing during typical ingest. But in the column store, it is typically saved because it might not be chaff or junk from the point of view of the query schema during Schema-on-Read, and is certainly required for unzip. The Chaff Column is its own primary (parent). It typically does not have any secondary associated with it. The Chaff column is the same type as the Zipzag Representation of all other user Columns, i.e. Parquet Binary or String type.

8.20 Oracle Numbers Representation

Oracle number representation may be natively supported in the column store partition. Typically, it is expected than an Oracle Number representation would be a secondary to a corresponding primary representation in the Parquet partition, which might be encoded as one of the numerical types, INT32, INT64, FLOAT, or DOUBLE. Typically INT96 is used in Parquet only for timestamps, and there it typically maps to Oracle Date in the column store. But this is not mandated; indeed it is permissible for a secondary representation of any primary representation, even INT96 to be any type, even Oracle Number, or strings or indeed anything else without restriction.

The Precision and Scale of Oracle Numbers used during ingest in the column store is written into the annotation of the metadata.

The rounding properties of Oracle Numbers presents an interesting choice. Since Oracle Numbers has different numerical error, rounding, and truncation properties than any of the Parquet numerical data types (INT32, INT64, INT96, FLOAT, or DOUBLE), there exists a choice on how to handle this divergence. This choice depends on the user requirements. This is supported using additional informative annotation tags.

8.21 Oracle Dates Representation

Oracle Dates is an Oracle proprietary and powerful format for representing date stamps and time stamps. It would be commonly paired with INT96 in the Parquet world, which is commonly used for timestamps.

8.22 Secured Representations

The Nymbl compressed streams can be optionally encrypted. The encryption algorithm may be AES-128 or another encryption algorithm. User supplied implementations of AES-128 can be supported. In an embodiment, such as for special government customers, custom encryption algorithms can be supported. These representations are called Secured Representations.

8.23 Redaction, Masking, Tokenization and Other Derived User Features

Any Representation that is stored in Column Chunks in the column store partition can be secured in this fashion. If this Representation is a secondary to a primary representation in the Parquet partition, which is in the clear (i.e. unobscured), then they deliver one of various privacy functionalities such as Redaction, Masking, or Tokenization.

Which of those functionalities is delivered depends on the actual transformations done during ingest to produce the primary and secondary Representations. The wire format encoding of all forms of Secured Representations is the same. In particular, the wire-format or metadata only indicates that a particular representation is a Secured Representation, and does not indicated whether it Redacted, Masked or Tokenized or any such use visible feature. However, user annotation tags can be used to store such extra information; these opaque tags are simply carried as annotations within the file for access during inventory, and do not determine the reader functionality.

8.24 Column Store Metadata

Column store Metadata is a strict superset of Parquet metadata. It effectively extends the Parquet schema by one more level, with the last level being a system determined list of representations which have been actually ingested. The metadata is encoded as a Thrift structure which can be described as follows:

```
/**
* File format description for the column store metadata format
*/
namespace java com.oracle.nyral.enterprise.metadata
/**
* Supported encoding types for Column store.
*/
enum EPColumnEncoding {
// Plain data (no special encoding) PLAIN = 0;
// Dictionary encoding using plain data for dictionary page. DICT_PLAIN = 1;
}
/**
* Metadata structure for a column store column representation.
*/
struct EPColumnRepMetadata {
// Per-stream version number 1: required i32 version
// Representation path name 2: required string col_path;
// Encoding type
3: required EPColumnEncoding encoding;
// Offset of the data in the file 4: required i64 data_offset;
// Total length of the data written into the file for this representation. 5: required i64
written_length;
// Uncompressed size of the data 6: required i64 uncompressed_size;
}
/**
Metadata structure for a column store column, which contains
a set of representations.
*/
struct EPColumnMetadata {
// All representations of this column
1: required list<EPColumnRepMetadata> reps;
}
/**
Metadata structure for a column store row-group, which contains
a list of columns.
*/
struct EPRowGroupMetadata {
// Compression codec used for this row-group. 1: required string codec;
// Columns in this row-group.
2: required list<EPColumnMetadata> cols;
}
/**
Metadata structure of the Column store file metadata.
*/
struct EPFileMetadata {
// File version
1: required string version;
// Ingest file information
2: required string ingest_file;
// Ingest user information
3: required string ingest_user;
// Ingest timestamp
4: required i64 ingest_timestamp;
// Ingest schema (as a nyf json) 5: required string ingest_schema;
// All ingested Column store row-groups. 6: required list<EPRowGroupMetadata> row_groups;
}
```

8.25 Column Store Embedded Keystore

The column store may have an Embedded KeyStore. The Embedded KeyStore acts as a layer of indirection from user credentials (i.e. public key) to AES keys (i.e. private key) used to actually encrypt the data values. As referenced herein, public and private keys may or may not be for public key cryptography such as asymmetric cryptography. The Embedded KeyStore is serialized into the column store metadata. The Embedded KeyStore contains several hooks or slots, one for each User or Role which has been granted access to the Secured Data in the file. Each slot is encrypted using the public key corresponding to that User or Role, using the RSA two-key encryption algorithm.

Each slot item in turn contains a list of AES keys for all the Secured Representations. In particular, only Keys to those Secured Representations to which that particular User or Role has been granted access to is present in that slot. The order of these Representation keys is important, as it deter-mines the search order for opening the Secured Representations in a user-specified deterministic sequence.

In an embodiment, each data column is encrypted by its own private key. Each role or user may be entitled to access a subset of columns and thus a corresponding subset of private keys. Somewhat different subsets of private keys may overlap (i.e. contain some same private keys). Each subset of private keys is encrypted with the corresponding public key of the user or role.

9.0 Database Overview

Embodiments of the present invention are used in the context of DBMSs. Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command (e.g. query) may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

9.1 Query Optimizer and Execution Plans

Generally, a query compiles a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by a query optimizer.

The term query is used herein to refer to any form of representing a query, including a query in the form of a database statement or in the form of an internal query representation. A query optimizer may receive a query from another entity other than query parser, where the query received is in the form of an internal query representation.

A query optimizer generates one or more different candidate execution plans for a query. The query optimizer evaluates the one or more candidate execution plan to determine which should be used to compute the query.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

Compiling a query by entail transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common sub-expression elimination, outer-to-inner join conversion, materialized view rewrite, star transformation, and, join predicate push down. A query is rewritten by manipulating a deep copy of the query representation to form a transformed query representation representing a transformed query. The query as transformed is referred to herein as the transformed query; the query whose copy is transformed is referred to as the base query.

Query compilation may also perform more than one transformation for evaluation. Each transformed query generated for a query is referred to as a candidate transformed query or candidate query. A transformed query rewritten to generate another transformed query is referred to herein as a base query for the other transformed query. The query originally received by a query optimizer is referred to as the original query.

The original query an optimizer optimizes and the alternate transformed queries generated for the query are referred to individually as a "candidate query" and collectively as the "query search space." The one or more candidate execution plans generated for each query in the query search space are collectively referred to as the "plan search space."

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field pro-grammable gate arrays (FPGAs) that are persistently pro-grammed to perform the techniques, or may include one or more general purpose hardware processors programmed to perform the techniques pursuant to program instructions in firmware, memory, other storage, or a combination. Such special-purpose computing devices may also combine cus-tom hard-wired logic, ASICs, or FPGAs with custom pro-gramming to accomplish the techniques. The special-pur-pose computing devices may be desktop computer systems, portable computer systems, handheld devices, networking devices or any other device that incorporates hard-wired and/or program logic to implement the techniques.

Figure 8:
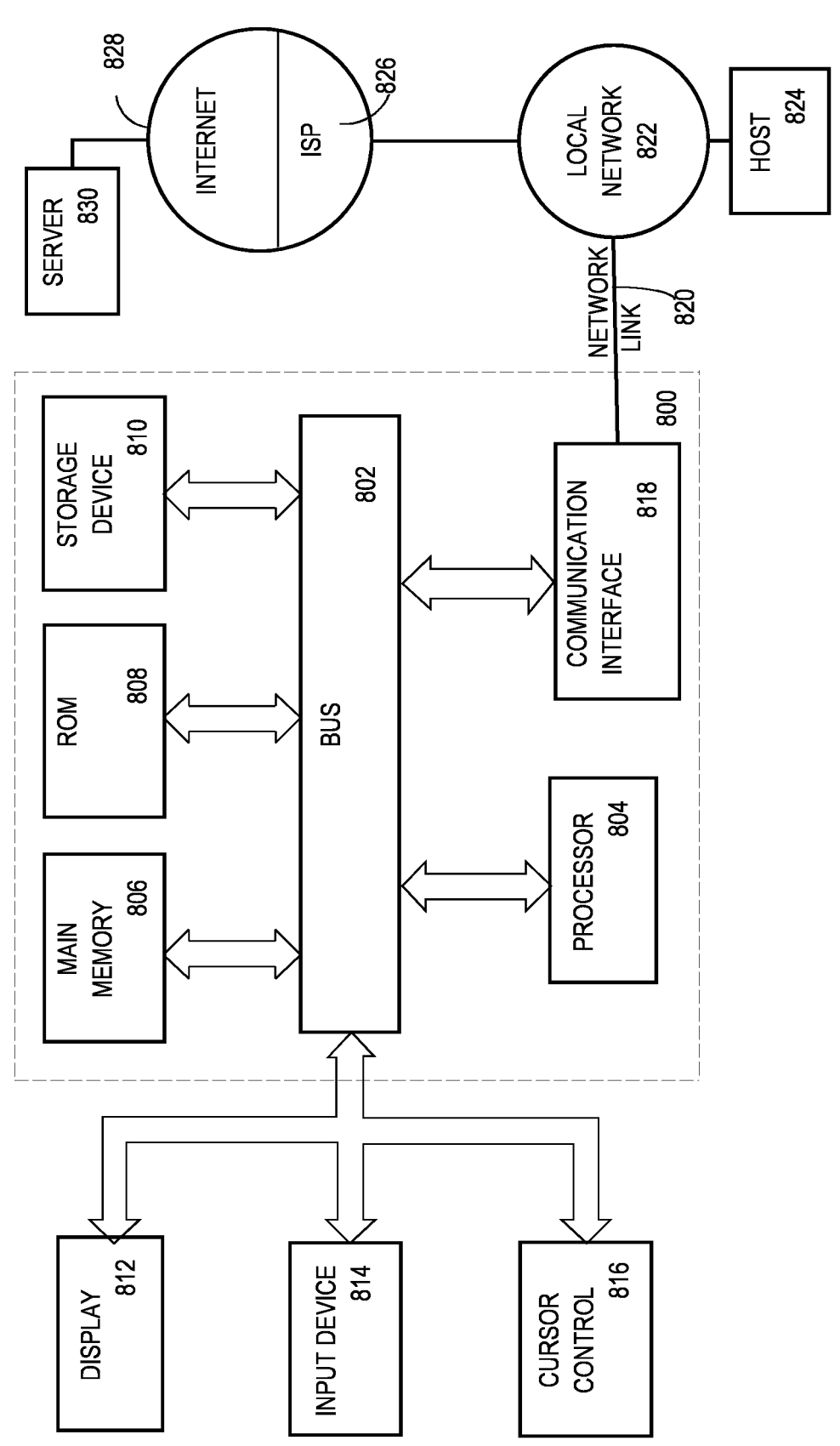
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary vari-ables or other intermediate information during execution of instructions to be executed by processor 804. Such instruc-tions, when stored in non-transitory storage media acces-sible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, includ-ing alphanumeric and other keys, is coupled to bus 802 for communicating information and command selections to processor 804. Another type of user input device is cursor control 816, such as a mouse, a trackball, or cursor direction keys for communicating direction information and com-mand selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execu-tion of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in con-junction with transmission media. Transmission media par-ticipates in transferring information between storage media. For example, transmission media includes coaxial cables, copper wire and fiber optics, including the wires that com-prise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may ini-tially be carried on a magnetic disk or solid-state drive of a remote computer. The remote computer can load the instruc-tions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of tele-phone line. As another example, communication interface 818 may be a local area network (LAN) card to provide a data communication connection to a compatible LAN. Wire-less links may also be implemented. In any such implemen-tation, communication interface 818 sends and receives electrical, electromagnetic or optical signals that carry digi-tal data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
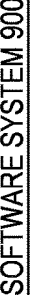
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 900 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, by a database server, in a single file as a plurality of pages, both of: an encrypted column and an encrypted private decryption key for decrypting the encrypted column;
modifying, after said storing, said single file without modifying said encrypted column;
receiving a request to read the encrypted column;
decrypting, based on a public key and said single file, the encrypted private decryption key into a decrypted private key, wherein the public key is contained in at least one selected from a group consisting of the request and the single file; and
executing the request by decrypting, based on the decrypted private key and said single file, the encrypted column.

2. The method of claim 1 further comprising generating, based on the public key, the encrypted column from an unencrypted column.

3. The method of claim 1 wherein:
the method is performed by a database management system (DBMS);
the method further comprises the DBMS associating the public key with a role in the DBMS.

4. The method of claim 1 wherein said request does not contain the public key.

5. The method of claim 1 wherein said modifying said single file comprises adding or removing a column in the single file that is not said encrypted column.

6. The method of claim 5 wherein said adding or removing comprises adding or removing, in the single file, at least one selected from a group consisting of a user of a DBMS and a role in the DBMS.

7. The method of claim 1 wherein:
the single file contains a plurality of encrypted columns that includes said encrypted column;
each column in the plurality of encrypted columns corresponds to a respective distinct key in a plurality of encrypted keys.

8. The method of claim 1 further comprising after said storing, modifying a keystore in said single file without modifying said encrypted column.

9. The method of claim 1 further comprising decrypting, based on said public key, a second plurality of encrypted keys that is a subset of a first plurality of encrypted keys.

10. The method of claim 9 further comprising decrypting, based on a second public key, a third plurality of encrypted keys that is a subset of said first plurality of encrypted keys.

11. The method of claim 10 wherein:
the third plurality of encrypted keys contains at least one key of the second plurality of encrypted keys, or
the third plurality of encrypted keys does not contain at least one key of the second plurality of encrypted keys.

12. A method comprising:
storing, in metadata, an encrypted private key for decrypting an encrypted column;
storing a file as a plurality of pages that consists of a first plurality of pages and a second plurality of pages, wherein said metadata identifies said second plurality of pages;
storing in the file:
the encrypted column and said metadata,
one or more independent columns in the first plurality of pages,
one or more dependent columns that includes said encrypted column in the second plurality of pages, and
second metadata that identifies said first plurality of pages but not the second plurality of pages;
modifying, after said storing the encrypted column and said metadata in the file, said file without modifying said encrypted column;
receiving a request to read the encrypted column;
decrypting, based on a public key and said file, the encrypted private key into a decrypted private key, wherein the public key is contained in at least one selected from a group consisting of the request and the file; and
executing the request by decrypting, based on the decrypted private key and said file, the encrypted column.

13. The method of claim 12 wherein said second metadata is located between said metadata in said file and the end of said file.

14. One or more non-transitory computer-readable media storing instructions that, when executed by one or more processors, cause:
storing, by a database server, in a single file as a plurality of pages, both of: an encrypted column and an encrypted private decryption key for decrypting the encrypted column;
modifying, after said storing, said single file without modifying said encrypted column;
receiving a request to read the encrypted column;
decrypting, based on a public key and said single file, the encrypted private decryption key into a decrypted private key, wherein the public key is contained in at least one selected from a group consisting of the request and the single file; and executing the request by decrypting, based on the decrypted private key and said single file, the encrypted column.

15. The one or more non-transitory computer-readable media of claim 14 wherein said request does not contain the public key.

16. The one or more non-transitory computer-readable media of claim 14 wherein said modifying said single file comprises adding or removing a column in the single file that is not said encrypted column.

17. The one or more non-transitory computer-readable media of claim 16 wherein said adding or removing comprises adding or removing, in the single file, at least one selected from a group consisting of a user of a DBMS and a role in the DBMS.

18. The one or more non-transitory computer-readable media of claim 16 wherein:

the one or more processors are in a database management system (DBMS);

the instructions further cause the DBMS associating the public key with a role in the DBMS.

19. The one or more non-transitory computer-readable media of claim 14 wherein the instructions further cause decrypting, based on said public key, a second plurality of encrypted keys that is a subset of a first plurality of encrypted keys.

20. One or more non-transitory computer-readable media storing instructions that, when executed by one or more processors, cause:

storing, in metadata, an encrypted private key for decrypting an encrypted column;

storing a file as a plurality of pages that consists of a first plurality of pages and a second plurality of pages, wherein said metadata identifies said second plurality of pages;

storing in the file:

the encrypted column and said metadata, one or more independent columns in the first plurality of pages, one or more dependent columns that includes said encrypted column in the second plurality of pages, and second metadata that identifies said first plurality of pages but not the second plurality of pages;

modifying, after said storing the encrypted column and said metadata in the file, said file without modifying said encrypted column;

receiving a request to read the encrypted column;

decrypting, based on a public key and said file, the encrypted private key into a decrypted private key, wherein the public key is contained in at least one selected from a group consisting of the request and the file; and executing the request by decrypting, based on the decrypted private key and said file, the encrypted column.

21. The one or more non-transitory computer-readable media of claim 20 wherein said second metadata is located between said metadata in said file and the end of said file.

* * * * *